United States Patent [19]

Bodkin

[11] Patent Number: 4,707,759
[45] Date of Patent: Nov. 17, 1987

[54] UNIVERSAL FAULT CIRCUIT INTERRUPTER

[76] Inventor: Lawrence E. Bodkin, 1149 Molokai Rd., Jacksonville, Fla. 32216

[21] Appl. No.: 831,642

[22] Filed: Feb. 20, 1986

Related U.S. Application Data

[63] Continuation-in-part of Ser. No. 706,174, Feb. 27, 1985.

[51] Int. Cl.$^4$ ............................................... H02H 3/16
[52] U.S. Cl. ....................................... 361/48; 361/45; 361/93; 361/102
[58] Field of Search ........................ 361/42, 45, 44, 46, 361/47, 48, 49, 93, 100, 102; 174/1, 5 R, 5 SG

[56] References Cited

U.S. PATENT DOCUMENTS

| | | | |
|---|---|---|---|
| 3,675,079 | 7/1972 | Labbaye | 361/8 |
| 3,997,818 | 12/1976 | Bodkin | 361/42 |
| 4,344,100 | 8/1982 | Davidson et al. | 361/45 |

Primary Examiner—A. D. Pellinen
Assistant Examiner—H. L. Williams
Attorney, Agent, or Firm—Arthur G. Yeager

[57] ABSTRACT

Improved shock and electrical-fire protection circuits provide line-to-ground plus "line-to-line" fault protection in a power system, and monitor conditions after protective interruption to safely provide automatic restoration of current when the fault is cleared. Both full-wave and half-wave circuits employ less expensive component combinations, including rectifiers and electromagnetic relays, to carry and switch load current. Protection is provided against the possibility of semiconductor failure and the hazards associated with severed power conductors. A specialized resistance network fault detector for sensitizing enclosures, a hybrid zero sequence current transformer system and polyphase supply provide additional features.

102 Claims, 6 Drawing Figures

UNIVERSAL FAULT CIRCUIT INTERRUPTER

This application is a continuation-in-part of my co-pending application Ser. No. 706,174 filed Feb. 27, 1985.

BACKGROUND OF THE INVENTION

This invention relates to electrical safety circuits designed to protect personnel against injury by shock in the event of accidental contact with current-carrying conductors. More particularly, the circuitry relates to a type of protective circuit now generally referred to as the "Bodkin Circuit", (U.S. Pat. No. 3,997,818), which affords special as well as conventional protection, detecting as fault current an accidentally induced or unintended current flow between the hot and the return or neutral conductors in a power cable, thereby providing a substantially universal protection wnich includes, but is not limited to, detection and reaction to fault current flow from the hot wire to a ground other than that represented by the return conductor, as conventional ground fault circuit interrupters are limited.

While this added feature of "line-to-lipe" or "load fault" protection in the transmission of electric power provides additional shock protection to a person by protecting in circumstances beyond the control capabilities of conventional or prior state-of-the-art equipment, it also in a similar fashion serves to protect from a common cause of household fire in which deteriorating insulation can result in line-to-line arcing where insulation between conductors may be deteriorated by physical abuse and also by heat, which is often generated at resistance areas which may result from physical abuse. This type of protective circuit is also inherently less sensitive to false tripping caused by certain types of line and load-originating transient conditions, and is capable of being operated reliably over a broader range of sensitivity, adjustable to permit substantial leakages in circumstances where such may be desirably and safely tolerated before turn-off, but capable of being made to react to fault currents of less than one milliampere where even minute leakage faults may be considered undesirable, as in some circumstances involving medical equipment or specialized industrial testing or processing devices. It also is able to monitor fault presence after power to the load has been interrupted, and to automatically restore power once the fault has been corrected or cleared.

In the prior circuits disclosed in U.S. Pat. No. 3,997,818, preferred load-current protective switching has been accomplished by means of directly and indirectly controlled solid-state devices or thyristors such as silicon controlled rectifiers. While economical to employ where current demands are not great, such devices capable of carrying heavier currents usually above 35 amperes, appear to rise almost exponentially in cost with further increases in capacity. Even with improved performance and tolerances to abuses, including the ability to withstand momentary surge currents that far exceed their rated capacities, they still suffer criticism from many areas in regard to their susceptibilities to surge-related damage and also their tendency to distort wave form and/or introduce harmonics. However, the "full-on" typical operating characteristic of this circuit principle tends to avoid the problems associated with phase control. Derating is a means to increase resistance to abuse which has not been economically feasible in the case of the switchable solid state devices such as the SCR due to the aforementioned rapid rise in cost associated with higher ratings. Where heavy load currents must be carried by solid state devices in accordance with the present invention, they are not switched by such devices, they are only rectified by the simpler diode devices which are more readily and economically available in very high ratings and which therefore can be selected to have excessive capacities for higher tolerance to such abuses at acceptable cost. The invention includes means to initiate a turn-off of the supplied power of such a rectifier fails in its ability to rectify, but remains conductive. While solid state switching devices are employed in the control circuitry of this invention, they are relieved of high current carrying requirements and are substantially isolated from the load and line transients which would comprise abuse and may thus be also readily provided in a convenient and inexpensive integrated circuit form. Where heavy currents are to be switched, the solid state semi-conductor circuits control more conventional electromechanical relay means which are utilized in a normally open contact armature arrangement, as shown in the preferred embodiments, so that relay failure would be anticipated to be in the open state.

When the conductors in a power cable are cut, free and contactable ends can be exposed including those of that portion of the cable still connected to the power source and of that portion still connected to the device comprising the load. Protection provided by the prior art, as in U.S. Pat. No. 3,997,818, includes protection in the event of contact with such ends when placing the body in a connective position between said conductors or even between these conductor ends and the exposed ends of the conductors still attached to the load, but special situations may occur in which the cable is only partially cut. One such situation is when the hot wires remain intact and connectively coupled to the load and the ground becomes interrupted so that the portion connected to the load and thus to the power source through the load becomes exposed and contactable. Simultaneous contact with this exposed end and the ground can permit current to flow through the body from the power source in series with the load and its identifying diode or diode bridge and not cause a by-pass of tne diode in the load to provide reverse current and initiate turn-off as it would if one of the hot leads were contacted. This represents a possible shock circumstance for which protection in the aforementioned patent was obtained by passing an initial warning current and substantially delaying turn-on time of load current but is a circumstance for which protection, in accordance with the present invention is provided without requirement for such delay and the delaying devices.

While conventional GFCI protected circuitry can trigger turn-off when the current from a severed ground side conductor still connected to the load is diverted to a ground other than that represented by the return conductor, the improved circuits of this invention detect and react to fault current flow even when undiverted or when the ground of a reconnection after severance is provided by the return conductor, for which protection is conventionally or otherwise unavailable.

SUMMARY OF THE INVENTION

The improved circuit in accord with one aspect of the invention includes a load and a first blocking means connected in series to the load for passing substantial current in one direction through the load and passing substantially less current in the opposite direction. A supply circuit is connected to the load to connect the load to an alternating current source, such supply circuit including a second blocking means for passing substantial current in the one direction through the load and passing substantially less current in the opposite direction through the load. The circuit includes a load current switching means for supplying the substantial current from the alternating current source to the load in the one direction through the first and second unidirectional blocking means. The supply circuit further includes a unidirectionally triggered switching means for supplying actuating current in the one direction to the load current switching means. A control means is in the supply circuit and is connected to the unidirectionally triggered switching means for substantially reducing the actuating current to the load current switching means through the unidirectionally triggered switching means and substantially reducing the substantial current in the one direction supplied by the load current switching means whenever a load circuit providing current flow in the opposite direction is connected to the supply circuit.

In other aspects each of the first and second blocking means is preferably a rectifier, and the first blocking means may be attached to the load and form a load circuit separable from the supply circuit or may be located in the supply circuit separable from the load. Preferably the load current switching means is a relay in which a pair of contacts is closed when energized and completes a normal energizing current path for the relay by contacting a grounded conductor from the alternating current source, such relay having an additional initial energizing path when not energized by contact with a grounding conductor. A momentary initial energizing current path is provided by the relay through contact with the grounding conductor and without connection to the grounded conductor from the source.

In yet other aspects the improved circuits include a third unidirectional blocking means in the supply circuit and connected in parallel with the load, such means having a forward current direction and a blocking direction opposed to the blocking direction of the first unidirectional blocking means and providing a path for current to pass to the unidirectionally triggered switching means in the opposite direction. Also, means to produce a fault condition detectable by the system in response to a fault which may not be otherwise detectable includes a zero sequence current transformer surrounding the current carrying conductors from the source to the supply circuit for producing a current in the coil of the transformer when an inequality in the amount of current carried by the conductors results from a ground fault. Amplifying of the transformer coil current energizes such means to produce a detectable fault condition and actuates said control means.

Additional aspects in another circuit provide for a third unidirectional blocking means in the supply circuit for passing substantial current in the one direction through the load and passing substantially less current in the opposite direction. The second unidirectional blocking means connects one conductor of the source to the load and the third unidirectional blocking means connects the other conductor of the source to the load. A resistance and a voltage breakdown means or a pair of voltage breakdown means respectively shunts the third unidirectional blocking means and the first unidirectional blocking means and is connected to pass current in the one direction; the resistance and voltage breakdown means or each of said pair of voltage breakdown means having a reverse current voltage breakdown characteristic wherein substantially less voltage than the voltage provided by the source initiates reverse current conduction therethrough, and the combination having a combined total voltage requirement for initiation of a reverse current flow of fault indication level that substantially exceeds the voltage level supplied by the source so that unintentional shunting of either the third unidirectional blocking means and shunting means combination and the third unidirectional blocking means and shunting means combination applies to the other an increased reverse current voltage which exceeds the requirement to initiate turn-off of the load current. A resistance shunts the third unidirectional blocking means but may be replaced by a combination of a voltage breakdown means with a resistance or a rectifier diode. Preferably the voltage breakdown means is a Zener diode. Additional aspects include means to pass relay actuating current through the load circuit in a combination that provides automatic turn-off in the event of disconnection of a low resistance load path even in the presence of a high resistance path with subsequent turn-on requirement that reestablishment of a low resistance path be made in the absence of a higher resistance path, such higher resistance path being recognized by the circuit as a fault connection.

The above described aspects have been chiefly described relative to half-wave embodiments but have reference to application of both half-wave and full-wave current to the load. However, additional unidirectional blocking means, unidirectionally triggered switching means, control means, and other associated circuit components would need to be added to those mentioned to provide the above aspects in supplying full wave current to the load.

Specific aspects include the provision of a resistance network connected between the first and second conductors of the source for developing a small current to indicate connective fault conditions and to initiate protective interruption of the substantial current to the load, such network including two directional resistance means for providing high resistance to a sensing current passing in one direction and low resistance in the other direction. The directional resistance means are oriented in the same direction between the conductors to provide the high and low resistance to the sensing current flow, and interrupting means is connected between the supply and the load, responsive to small current from the resistance network, for interrupting the substantial current flow from the source to the load. The high directional resistance in the resistance means to current passing in the one direction is substantially less than the resistance presented by a rectifier in its blocking direction. Preferably the directional resistance means includes a unidirectional blocking means and a resistance connected in parallel. The second conductor is a grounding conductor, and a third conductor from the source is a grounded conductor. One of the directional resistance means is connected to the first conductor and the other directional resistance means is connected to the second conductor and both such directional resistance means are connected together by a common resistance.

A series connected resistance and unidirectional blocking means connects one directional resistance and a common resistance to an indicator terminal, and is oriented to pass current in the other direction of low resistance of the one directional resistance means to pass current between the first conductor and the indicator terminal in the other direction and to block current between the indicator terminal and the first conductor through the one directional resistance and the one direction. The other directional resistance and the common resistance are connected to another detector or indicator terminal. A second unidirectional blocking means is connected by a sensor lead from one detector or indicator terminal to the third conductor. The second unidirectional blocking means is oriented to pass current between the third conductor and the sensor lead in the direction of low resistance of the one directional resistance, wherein contact between the sensor lead and any conductor of the source, or the ground to which the second and third conductors are connected or a discontinuance in the connection of the resistance network to the conductors from the source other than the first conductor or a disconnection of the third conductor from the load develops a current across the indicator terminals.

An electrically conductive means, such as an enclosure or support structure, in proximity to the load, is to detect fault currents, and a third unidirectional blocking means passes current from the sensor lead to the conductive means in the same direction as that of the lower resistance in the one directional resistance, wherein an indicator current is developed across the detector terminals as a result of conductive contact between the conductive means and said first conductor of the source but not the ground to which the second and third conductors are connected and also as a result of a discontinuance in the connection of the resistance network from the source other than the first conductor, or as a result of a discontinuance in the second or third other conductor connection with the load. Another such electrically conductive means is located in proximity to the interrupting means, a fourth unidirectional blocking means connects between the sensor lead and the other conductive means to pass current between the indicator terminal and the other conductive means when conductively contacted by the first conductor.

The connection between the one directional resistance and the common resistance is further connected to the one conductor from the source through another resistance for latching the interrupting means in the off-state. The other resistance is connected to the one conductor from the source through a switching device for selectively disconnecting the other resistance. A current responsive indicating and/or relay device connected to the indicator terminals reacts to the presence of a fault condition.

Further additional aspects include the network means connected to a current supply and a load in which at least four interconnected resistances and three unidirectional blocking means are included. At least two of such resistances are respectively connected to two of such unidirectional blocking means in parallel. At least one of such resistances of one of such unidirectional blocking means are connected in series. The network means is connected between one and another conductor of a current source and at least one pair of indicator terminals across which a current is developed to indicate faults of hazardous conductance and discontinuance of conductance in the power system. A sensor lead to detect hazardous conductance and discontinuance is connected through a fourth unidirectional blocking means to the other conductor from the source. The sensor lead is connected from the one indicator terminal to a conductive means adjacent to the load and/or network means to detect hazardous conductance to the current source. The sensor lead connection to the conductive means is made through a further unidirectional blocking means to detect hazardous conductance to the current source other than ground.

Briefly stated, an object of this invention is to provide devices for improved protection against electrical shock and electrically caused fires in a manner which substantially reduces the current carrying requirements of solid state devices in their control circuitry and permits the use of main current switching devices other than, for example, the silicon controlled rectifiers. More specifically, objects hereof includes the substitution of switching combinations, including electromechanical relays, to reduce cost in high current applications and to substantially avoid undesirable waveform distortion and/or introduction of harmonics sometimes associated with solid state switching, and to obtain a failure mode of the components which is open or non-conductive rather than closed or conductive, and to reduce the possibilities of surge damage to those solid state devices which are required to carry the main current in conjunction with the relays by employing simple unidirectional blocking means or non-controlled rectifiers which may be economically derated or selected to have a much higher rating than required to provide a high margin or tolerance for abuse at feasible cost.

Another object is to provide automatic turn-off of power in the event of a conductive rectifier's failure to rectify and a silicon controlled rectifier's failure to respond to controlling currents.

A further object of this invention is to provide protection in the event a return conductor on the grounding side of a proper load is interrupted and a fault connection is made that places the body in series position with the load, wherein contact is made with that portion of the return conductor connected to the rectifier diode or diode bridge indentified proper load while its connection to the hot side of the supply circuit is uninterrupted and a connection providing a path to ground is subsequently made even when it may include that portion of the ground conductor still connected to the ground.

An additional object is the provision of conductive means for example, a conductive enclosure, frame or shield adjacent the supply and/or the load, as a fault sensitive terminal connected to a fault sensor lead so that turn-off may be initiated by conductive contacts of the sensor lead or enclosure with the current carrying portions of the load that are hazardously above ground potential whether contact is direct or is made indirectly as by passing a current through the human body, with the enclosure, which is also made incapable of initiating turn-off when connected to ground to avoid unwarranted nuisance turn-off such as may occur in tools or appliances used in conjunction with grounded materials, but with the fault sensor lead being capable of initiating turn-off when connected to ground to protect against a disabling shorting contact with ground or grounded conductor and being capable of initiating turn-off if disconnected to prevent use without the protective system.

Another object of this invention is to provide means for phase mixing in the current supplied to the improved circuits wherein polyphase currents may be used to advantage in increasing the percentage of forward current conduction time in each half-wave device while maintaining sufficient reverse current and reverse current conduction time to permit reaction to reverse current and thus provide fault protection.

A further object of this invention is to provide a synchronous switching means to assist or replace load current carrying rectifiers to reduce or substantially avoid the generation of heat in forward conduction and thus reduce or substantially eliminate the need for heat sinking devices for such rectifiers.

BRIEF DESCRIPTION OF THE DRAWINGS

The invention both as to its organization and principles of operation, together with further objects and advantages thereof may be better understood by reference to the following detailed description of the embodiments of the invention taken in conjunction with the accompanying drawings in which.

DESCRIPTION OF THE PREFERRED EMBODIMENTS

Figure 1:
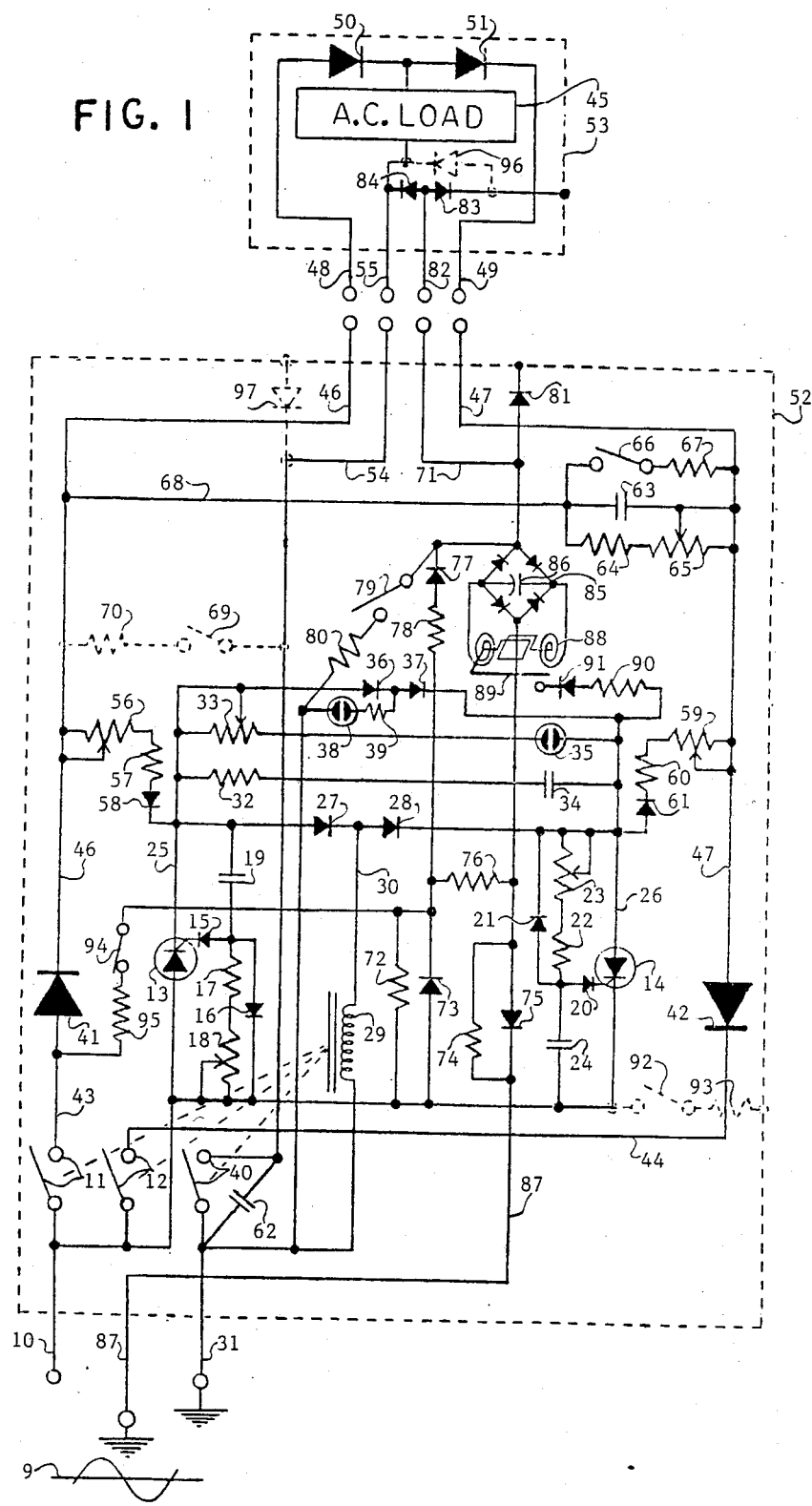
FIG. 1 is a schematic diagram of the first embodiment of full-wave circuitry to provide electrical shock and fire protection in accordance with this invention.

Referring now to FIG. 1, the circuit illustrated passes 120 volt 60 cycle alternating current from its source 9 through "hot" conductor 10 to a pair of reverse blocking thyristors or silicon controlled rectifiers 13 and 14 having respective gate control circuits composed of rectifier diodes 15 and 16, resistances 17 and 18 and capacitor 19 for SCR 13, and of rectifier diodes 20 and 21, resistances 22 and 23 and capacitor 24 for SCR 14. Each of the controlled rectifiers 13 and 14 is arranged to pass a half-wave component of the full-wave alternating current from source 9 through SCR 13 in one direction, and through SCR 14 in the other direction through respective rectifier diodes 27 and 28, and thus as a reconstituted full wave A.C. current through conductor 30 which is connected between diodes 27 and 28, and thus through the coil of relay 29 to the grounded return conductor 31 to complete a relay coil energizing circuit. The parameters of the SCR's 13 and 14 and their respective immediate phase control circuitry assure a fixed firing angle of 180 degrees or a full "off" state with normal attachment to a load such as the coil of relay 29 by a direct connection of conductors 25 and 26 to conductor 30 in which the reverse blocking rectifier diodes 27 and 28 would be excluded. When the connection is made through diodes 27 and 28 to effectively block reverse current to their respective SCR's 13 and 14, a full "on" state is achieved which will then revert to the "off" state whenever sufficient reverse current is permitted to by-pass such blocking rectifiers as by means of a fault connection between conductors 25 and 30, 26 and 30 or between 25 and 26. Resistors 32 and 33, capacitor 34 and neon lamp 35 form a synchronizing circuit to assure substantially simultaneous turn-off of current by both controlled rectifier circuits, when either is triggered to the turn-off state by passage of sufficient reverse current and reverse blocking rectifier diodes 36 and 37 with neon lamp 38 and resistance 39 comprise a small load to assist in regulating triggering and commutation. The function of this circuit is explained in detail in U.S. Pat. No. 3,997,818, but in a full-wave system, it may also be said in brief explanation that the principle involves transmission to a diode equipped load of the two separated half-wave components of a full-wave alternating current providing reaction to introduction respectively of reverse current components as from grounded source into the respective separated transmission conductors to the load as a fault. The diodes of the load serve to block such reverse components from the transmission conductors prior to their reconstitution of the full-wave A.C. current at the load and are preferably placed in immediately prior proximity to the load and within the load enclosure. Where the two half-wave components of the A.C. current may continue to be separated in the load, as by division or pairing of load elements, and be applied to the load before reconstitution, the blocking rectifier diode for each half-wave xay be located immediately following the load to extend the line-to-ground protection afforded lines 48 and 49 to points within the load. If the ground fault characteristic is desired without the line-to-line protection, the load need not be immediately equipped with the blocking diode and it may be relocated to within the supply enclosure 52 to beccome a part of its circuitry. In FIG. 1, the "hot" conductor 10 also passes through pairs of load current carrying contacts 11 and 12 which are closed by the armature of relay 29 together with load current carrying contact pair 40 when its coil is energized. The contact pairs 11 and 12, when closed by energizing of the coil of relay 29, are connected to pass current from conductor 10 to conductors 43 and 44 and thus through the load current carrying rectifier diodes 41 and 42 in the controlled supply, as defined by enclosure 52, through conductors 46 and 47 and through their continuations 48 and 49 at the load and within the load enclosure 53 through load current carrying diodes 50 and 51 to pass full wave A.C. current through load 45 to the grounded return conductor 55 connectively included within enclosure 53 and its cable connected supply conductor 54 connectively included within enclosure 52 which in turn is connected to the conductor 31 from grounded side of the A.C. supply 9 through the contact pair 40 closed by the armature of relay 29 when its coil is energized, thus completing the load current circuit.

The conductors 25 and 26 are connected to the load carrying conductors 46 and 47 respectively by the respective resistance and rectifier diode coupling combinations 56, 57, 58, and 59, 60, 61, which are adapted to pass reverse currents when applied to conductor 46 and/or 47 on to SCR's 13 and 14, respectively, with their gate control circuits, in order to initiate the termination of their energizing of the coil of relay 29 and the opening of contact pairs 11, 12, and 40 as a reaction to a fault condition. The load current carrying diodes 41 and 42, oriented to block current and pass current in the same direction as their respectively associated reverse current blocking thyristors or SCR's 13 and 14, serve to shunt forward current to the load 45 but not to shunt reverse, fault indicating currents which are passed to the SCR's from the load current carrying conductors 46 and 47 and their respectively connected load circuit continuations 48 and 49. Without unidirectional blocking means 58 and 61, resistances 56 and 59 adjust current in both directions from SCR's 13 and 14. As a stabilizing enhancement forward currents to the load from SCR's 13 and 14, are respectrvely blocked by diodes 58 and 61, each oriented to pass current only in the reverse direction for its immediate SCR and forward current from the other passed through diodes 27 and 28 and diodes 36 and 37. When sensitivity adjustment external to variable resistances 18 and 23 of the gate control circuits is not desired and diodes 58 and 61 are in place, variable resistances 56 and 59 may be eliminated, and resistors 57 and 60 given a factory determined preset value.

Capacitor 62 is placed across contact pair 40 to provide a sensing continuance to assist in monitoring a fault condition after opening of the circuit by relay 29. In this arrangement the type of protection provided by the SCR control circuitry is against direct or indirect accidental conduction between power conductors in a connective cable and accidental conduction wherein its "hot" power conductors may make inadvertent direct or indirect grounded contact exterior to the circuit and produce "ground fault". In accordance with this invention there is a transfer of the protective qualities inherent in the small current capacity SCR circuit that controls the coil energy of relay 29 to the larger current carrying circuitry which is controlled by the relay contacts. This provides advantages in both economy and reliability permitting SCR's to be inexpensively small and substantially isolating them from surge damage and the substition of the simple rectifiers 41 and 42 as the load carrying solid state components which can be economically derated to provide greatly increased surge resistance.

This aforementioned arrangement when sensitively adjusted by resistances 56 and 59 and/or resistances 18 and 23 is also capable of detecting a conductive failure of the rectifiers 41 and 42, a condition in which current is no longer rectified but passed in both directions, and is capable of initiating protective interruption of load current as a result. Capacitor 63 connected to conductor 47 and to conductor 46 by conductor 68 serves to stabilize such a sensitive condition making the circuit resistive to false tripping without losing sensitivity to such failure. Such failure in other rectifiers 27, 28, 36, 37, 50, 51 and 84 automatically initiate interruption of load current. The parallel connected series resistance combination comprising 64 and 65 serves to further modify and adjust the turn-off reaction. The series combination of S.P.S.T. switch 66 and resistance 67 connected in parallel with capacitor 63 and in parallel with series combination of resistors 64 and 65 provides latching upon fault when switch 66 is closed, requiring switch 66 to be opened to accomplish reset. When switch 94 is left open connecting lines 43 and 44 by a S.P.S.T. switch (not shown), can produce a similar latching effect. Such a switch and connection may be made directly without including a resistance. If switches 66 and 94 are left open, an automatic reset capability is established and reset will occur upon clearing of the fault condition. If switch 66 is left open and switch 94, which is connected to a resistance network, is closed, a latching capability capable of remote reset is established. If fault occurs while the load is connected, the "off" condition will continue after clearing of the fault but may be reset to "on" without opening switch 94 by simply switching the load current off and then back "on" at the load. With switch 66 ieft open, resistance 65 may be adjusted to a lower value to provide a similar "remotely resettable" latching condition in the event of fault or a portion of the resistance may be made switchable to control the value. If manual reset is desired, switch 66 must be reclosed and where a manual reset is mandatory, a normally closed spring return switch, such as a pushbutton switch, should be employed for switch 66. A possible test switch position for the circuit is connectively shown by broken lines depicting a series combination of normally open spring return switch 69 and resistance 70 connected between grounded return conductor 54 and hot half-wave conductor 46.

The remaining components in the schematic are part of a low current resistance network which is capable of sensing fault and sensitizing supply enclosure 52 and load enclosure 53 to assist in detection of fault. These need not be interpreted as enclosures in the fullest sense, but as conductive areas of frame, case, or shielding which are intimately associated with supply or load circuitry and would be unavoidably involved at least to some degree in transmission of fault current from supply or load elements. Load current is interrupted whether such fault current is applied directly to the enclosure or applied indirectly as through the human body. The arrangement initiates turn-off by triggering the previously described protective circuit and provides additional protection by responding to fault contact between either enclosure and either of the half wave supply conductors 46 and 47, or their load circuit continuations 48 and 49, between either enclosure and any conductor of A.C. current, interior or exterior to the enclosures 52 and 53 from the same current source, but with no current interruption in response to ground contact with either enclosure in order to avoid nuisance tripping where tool or appliance contact with grounded work is anticipated, but providing an availability of turn-off in response to ground contact of enclosures when desired. Load current is also interrupted if the ground conductor 54, 55 or that of a conductor in a cable connecting them should be cut in such a way that hot conductors 46, 48 and 47, 49 and their connecting conductors remain intact. The relay 29 opens and, in either of the latching modes direct or indirect, reconnection to ground will not-initiate reset to avoid the shock hazard that might result from subsequently passing current through the body in series with the diode equipped load. Load current is also interrupted if the sensor lead 71 is grounded or if the sensor lead 71 is interrupted such as may occur accidentally or in a willful attempt to defeat the system. The arrangement will not be energized if the third wire ground which is employed as a source of reference potential is disconnected or if the hot and return ground conductors 10 and 31 are reverse connected. In either of the two latching modes simple clearing of a detected fault does not cause reset. The sensing network comprises two directional resistances, each composed of a parallel connected resistance and diode, 72, 73, and 74, 75 respectively, the first being connected to the hot conductor 10 and the second being connected through resistance 76, to the first and to hot conductor 43 through the series combination of S.P.S.T. switch 94 and resistance 95 which establishes the remotely resettable latching mode. The first directional resistance 72, 73 is connected to one A.C. terminal of a full-wave rectifier bridge 85 through the series combination of diode 77 and resistance 78, to sensor conductor 71 through the same diode 77 and resistance 78, to grounded conductor 31 through the series combination of diode 77 and resistance 78 plus the series combination of S.P.S.T. test switch 79 and resistance 80 and to enclosure 52 through the same series combination of rectifier diode 77 and resistance 78 plus rectifier diode 81, and to enclosure 53 through the same diode 77 and resistance 78, sensor conductor 71, connector continuation 82 and the rectifier diode 83. The same diode 77 and resistance 78 combination connect the first directional resistance 72, 73 through conductor 71, 82 and a rectifier diode 84 to grounded return 55 in the load enclosure 53 and thus to its grounded connector continuation 54 in the supply enclosure 52. The second directional resistance comprising the parallel combination of resistance 74 and diode 75, which is connected to the first directional combination of resistance 72 and diode 73 through resistance 76, is connected at the end connected to resistance 76 to the other terminal of the full wave rectifier bridge 85 and at the other end to the third wire grounding conductor 87. A filter capacitor 86 (optional) assists in smoothing the D.C. output of the rectifier bridge 85 which is supplied to a relay device 88 shown with a sensitive D'arsonval meter type movement which, when energized, moves the conductive armature projection 89, normally employed as a pointer and normally connected to one side of the coil, into contact with the cathode terminal of diode 91 to create a fault reaction by passing reverse current from conductor 26 through resistance 90, rectifier diode 91, and a diode portion of the rectifier bridge 85 to the third wire ground 87 through the rectifier 75 in the directional resistance combination of parallel connected resistance and rectifier 74 and 75. This connection could also be made to grounded or return conductor 31 instead of 87 if confirmation of a properly wired receptacle connection is not needed. The sensitive relay 88 was chosen because although the currents indicating fault as developed by this network are very small, the current to be controlled is also very small with most amplification of effect occurring subsequently as a result of SCR control of relay coil current. Other sensitive relay means, as known in the art, such as the various forms of optocoupling devices could be substituted, but the developed currents in the preferred embodiment are less than required for a proper L.E.D. illumination of the photosensitive element in most such commercially available devices, and except where strong vibration might be encountered the D'arsonval relay is practical. If current direction is not a factor in actuating the relay device used, the rectifier bridge 85 may be eliminated.

The series combination of normally open S.P.S.T. switch 79 and resistance 80 is used to produce a test fault condition of sensor conductor 71 to grounded conductor 31 which is preferred to that produced by the combination of switch 69 and resistance 70, since it actuates the small relay 88 of the sensor network which then actuates the SCR circuit and its controlled large power relay 29 and thus serves to test both sectors of the system. A third series combination comprising a normally open S.P.S.T. switch 92 an resistance 93, shown in broken lines, can be employed to produce a test fault condition by connecting the enclosure 52 in a safely resistant manner to the hot side of the line 10. In the instance of a fault from within the load 45, the level of current developed to energize relay device 88 and trigger protective responses of the SCR control circuit and thus the relay 29 is determined by the impedance of the load connecting the point of fault to the hot side and the impedance of the load remaining between the point of fault and the ground conductor 54-55 connected to grounded return 31 and is thus commensurate with the level of current constituting the hazard.

One current from hot conductor 10 that would energize relay device 88 would pass through rectifier 73 and resistance 76 to one A.C. terminal of the full wave rectifier bridge 85, through the bridge and through the relay means 88, to the other A.C. terminal, sensor conductor 71, its continuation 82 and the rectifier diode 84 to grounded conductor 55 and its continuation 54 to grounded conductor 31 through relay contact pair 40, but is normally shorted out by rectifier 75 connecting the said one bridge terminal to grounding conductor 87 unless 87 is severed or otherwise discontinued. Another current from hot conductor 10 that would energize relay 88 would pass through rectifier 73, resistance 78, rectifier 77, to the other A.C. terminal of the full-wave rectifier bridge 85, through the bridge and the relay means 88 to the one terminal and through rectifier 75 to grounded conductor 87. This current is normally shorted out by sensor connection 71 connected to the other terminal and through its continuation 82 rectifier 84 connected to the conductor 54, 55, and the grounded conductor 31 through contact pair 40 unless the sensor conductor 71, 82 or grounding conductor 54, 55 are severed or otherwise discontinued.

Shorting between lines 55 and 82 or 54 and 71 or between lines 71 and 82 with any grounded or grounding source permits current to energize relay 88 by passing current from such ground source through full-wave rectifier bridge 85, relay means 88, resistance 76 and resistor 72 to A.C. connecter 10.

If sensor conductor 71, 82 are connected directly to a source of current such as shorting to hot half-wave lead 46, 48 and 47, 49 or a source of full-wave A.C. current, current will pass in one direction through the full-wave rectifier bridge 85, relay means 88, resistance 74 and the grounding conductor 87. Current which would pass in the opposite direction and through rectifier 75 and grounding conductor 87 is shorted to ground conductor 54, 55 by rectifier 84. In the case of contact with hot conductor 46, 48 a forward current from rectifier 41 is carried to ground by rectifier 84, and current from sensor conductor 71, 82 supplied by the resistance network is in the reverse direction relative to the circuitry of SCR 13 which would also tend to initiate its turn-off. In the case of contact with hot conductor 47, 49 the reverse current relative to the circuitry of SCR 14 passes through rectifier 84 and the current from sensor conductor 71, 82 is supplied by the resistance network in the forward direction of the SCR 14. If sensor conductor 71, 82 contact is made through rectifier 81 or 83, the process is the similar except contact with a source of ground does not cause a flow of current through the resistance network to energize relay means 88 and no substantial current is carried directly to ground unless optional rectifiers 96 and 97 are in place. Resistance 95 which, together with switch 94 controls the remotely resettable latch feature, is connected in parallel with resistance 72 so that the value thereof is reduced upon relay closure of contact pair 11 when switch 94 is closed. Resistance 95 must be a higher value, in the 1 megohm range, since it by-passes contact pair 11 and continues to connect hot conductor 43 to hot conductor 10 when the relay 29 is not energized, through the directional resistance comprising resistance 72 and rectifier 73 to produce its latching effect but it also connects to grounding conductor 87 as the directional resistance does which modifies tne effect, but conductor 43 also connects to grounded conductor 31 through rectifier 41, conductors 46 and 48, load rectifier 50, load 45 and onto grounded conductor 31. If this path is interrupted in a manner that does not in itself constitute another fault such as by a switch (not shown) connected between the juncture of rectifiers 50 and 51 and the load, the latching is voided and the circuit is reset. Such a load switch would be typical, for example, in a power drill or the like.

The following is a representative component list for the circuit of FIG. 1, including approximate values and ranges for a 120 volt model with function comments:

| | |
|---|---|
| silicon controlled rectifiers 13 and 14: | 1 to 3 amperes each, or as required to power the coil relay 29; Max. Igt 200 Microamperes, PIV 400 volts. |
| capacitors 19, 24, and 34: | .033 to .5 MFD, 250-400 WVDC. turn-on or reset time is delayed by increased capacitance in SCR gate circuits. |
| capacitor 62: | .015 to .033 MFD, 600 WVDC. |
| capacitor 63: | .5 MFD, 250-400 WVDC. |
| capacitor 86: | optional, 4 MFD or slightly larger, 50 WVDC or more to smooth rectifier bridge output and thus the armature motion in relay 88. If too large, may interfere with resetting. |
| small rectifier control and load circuit diodes 15, 16, 20, 21, 27, 28, 36, 37, 58, 61, 73, 75, 77, 81, 83, 84, 91, and the additional diodes comprising rectifier bridge 85: | 1000 PIV 2.5 ampere suggested. (general purpose type) |
| large rectifier grounding diodes (optional) 96 and 97: | 10-50 amperes or larger, no heat sink required, for fault use only. |
| large rectifier load current diodes 41, 42: diodes 50, 51: | combined ampere rating to exceed anticipated load. combined ampere rating to exceed attached load; PIV 200 volts or more, combined PIV twice line-voltage or more; adequate heat sinking required. |
| neon lamp 35: | NE-2, trigger effect assists in synchronizing SCR turn-off. |
| neon lamp 38 with series resistance 39: | NE-2 or other, approximately 1/25 watt preferable as a special dummy load to regulate SCR firing and commutation although a small value series resistance and capacitance may be used with some success. |
| resistances (¼-½ Watt) 17 and 22: | 300K-500K ohms; |
| 18 and 23: | 500K ohms (wherein adjustability is not required, 18 and 23 may be eliminated and values of 17 and 22 increased accordingly); |
| 32: | 470K ohms; |
| 33: | 1 megohm; |
| 39: | 56 to 100K ohms (related to characteristics of neon 38); |
| 56 and 59: | 50K ohms; |
| 57 and 60; | 10K ohms; |
| 64: | 3.5 megohms; |
| 65: | 500K to 1 megohms; or selected in adjustable value range to permit adjustment which will provide a remotely resettable latching feature similar to that provided by resistance 95 |
| 67: | 1 megohm; |
| 70 and 93: | 22K to 100K ohms (to confirm sensitivity); |
| 80: | 22K ohms; |
| 72: | 27K ohms, resistance reduction inhibits maintenance of the off-state in remotely resettable latching mode and increase lessens sensor 71 reaction to ground contact (72 may be made adjustable but should be preset and not be provided with user access); |
| 74, 76, and 78: | 100K ohms; |
| 90: | 27K ohms; |
| 95: | 1 megohm. |
| small relay 88: | D'arsonval type, sensitive movement relay S.P.S.T. or sensitive relay solid state equivalent (optocoupler, etc.); |
| large relay 29: | with 120 volt A.C. 3 P.S.T.; 4 P.S.T. preferred with contact pair 40 composed of 2 contact pairs connected in parallel to equalize current capacity on each side of the line, coil energized by SCR control circuit with armature carrying contact pairs 11 and 12, and 40 having ampere ratings to exceed anticipated load; |
| test switches - 69 (recommended), 79 and/or 92 (optional) | SPST one ampere or more contact rating; |
| latching switches 66 and 94: | S.P.S.T. one ampere or more con- rating if both are employed in circuit, they may be included as part of a D.P.D.T. switch to provide selection of one mode in one direction and the other in the other direction. |
| electrically conductive means, such as enclosures, frames or shields 52 and 53, for controlled supply and load re- | may be considered in the general rather than total sense and may include any conductive structure in proximity to current |

| spectively: | carrying elements of substantially higher or hazardous potential which is arranged to provide a probability of personal contact that would precede that of personal contact with the said higher potential elements or probability of direct structural contact with said elements that would precede a personal contact with said elements. |
|---|---|

Optional large diodes 96 and 97 provide a half-wave grounding of enclosures 52 and 53 which can be a protective means if the enclosures become grounded to an increasing extent determined by accident or by intent as in the working contact of a conductive tool and a grounding work structure. As the resistance between enclosure and ground becomes very low, the availability of detectable fault current to the sensing network in the event of enclosure contact with the hot side of the line becomes less with the extent of grounding, but simultaneously the availability of hazardous current is reduced by passage to ground to the extend that the grounding provides and may be reduced much further by the optional rectifiers which provide a 1/2 wave pathway directly to the ground without reduction of sensor sensitivity. Unlike conventional enclosure grounding, if the contact with the hot side of the line is to a user from an outside contact and through the user to the half-wave grounded conductive enclosure, the circuit will open its relay grounding and interrupt any hazardous pathway the grounding diode may have provided. A user is thus protected against current from conductors internal to the enclosure whether shorted directly to the enclosure or to the enclosure through the user and current from external conductor in which the enclosures may be anticipated to provide a hazardous ground path. When a conductive enclosure is externally grounded by some form of direct ground contact, it must simply be considered a conductive object in regard to external contact with current sources and circuit reaction with complete disconnection from its power source could not alter the conditions. In instances where inadvertent grounding of the enclosure can be avoided without restricting use direct connection of the sensor conductor 71, 82 to the enclosures 52 and 53 may be made directly, eliminating the directional blocking of coupling rectifiers 81 and 83. This would prohibit operation if enclosures were grounded and eliminate a shock pre-condition. In a sensitive state which can be achieved by adjustment of resistance 56 and 59, and/or 18 and 22 the failure of a large rectifier 41 and 42 to rectify in the conductive state which would desensitize the circuit to fault, will initiate turn-off of the circuit. This state is most suitable for resistive loads.

It is considered that the majority of supply components may be produced as an integrated circuit excluding the switches 66, 69, 79, 92, and 94, the large rectifiers 41 and 42, the large optional rectifier 97, the neon lamps 35 and 38, the large relay 29, variable resistances 56 and 59 and the small relay 88, unless a solid state equivalent is employed. To facilitate production in module or integrated circuit form, resistors 18, 23, 33 and 65, shown as variable or adjustable, may be replaced by fixed value resistances. Current carrying requirements are minute except for the provision of SCR's controlled power to the relay coil and this has very small requirements in the average arrangement. Large load circuit rectifiers 50, 51, 96 and small load circuit rectifiers 83 and 84 could also be provided in an integrated package. Conductor 87 is another or third wire ground and functions as a polarizing grounding reference to assure proper connection of the circuit to an appropriately wired receptacle, for example. Where this can be otherwise assured, conductor 87 can of course be attached to return conductor 31 within enclosure 52.

Figure 2:
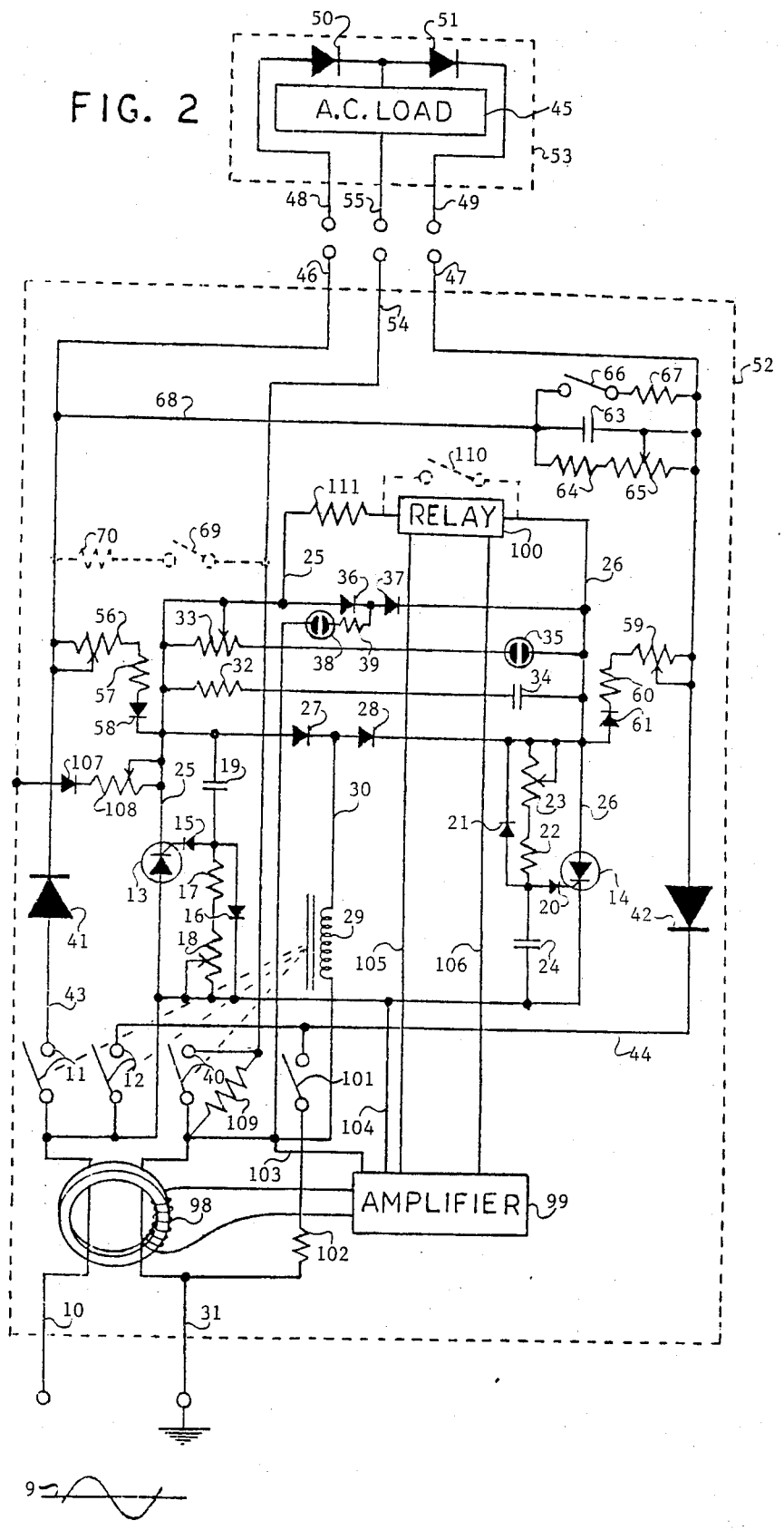
FIG. 2 is a schematic diagram of the second embodiment of full-wave circuitry for providing electrical shock and fire protection in accordance with this invention.

Referring to the embodiment of FIG. 2, the circuit illustrated is similar in many respects to FIG. 1 insofar as the SCR control circuitry and relay are concerned and corresponding components which have functions and values that are substantially equal are correspondingly numbered. Important differences are discernible in that only three wires are required in the controlled supply to load circuit connections, that no sensory network is included, and that a zero sequence current transformer 98, amplifier 99 and small relay 100 have been added. The conventional state of the art ground fault circuit interrupter principle is compatible with that of the present invention and its properties may therefore be combined in a manner in accord with the present invention to produce a high degree of line-to-line and line-to-ground protection. The SCR controlled relay circuit senses and responds to line-to-line or line-to-ground faults and the zero sequence current transformer 98, which is the type employed as the sensing element in conventional GFCI fault protection devices, senses line-to-ground fault and faults to ground from within the load and in accordance with the invention, responds by triggering response of the SCR controlled relay circuit. The SCR controlled relay circuit could simply be plugged into a commercially available GFCI unit to provide much the same combined protection effect, but the embodiment disclosed in FIG. 2 provides the economy inherent in multiple use of components and has other attendant advantages.

The higher current amplifier output required by the conventional GFCI to energize its own power relay becomes unnecessary in view of the disclosed circuit arrangement. A much smaller amplifier 99 providing much less output current is employed to energize a very sensitive relay 100 which may be like relay device 88 employed in the circuit of FIG. 1 or one of the aforementioned equivalents, which is connected to switch the minute reverse current required for triggering the SCR circuits and thus to permit the use of the same power relay 29.

In the circuit of FIG. 2 other differences include a series combination of S.P.S.T. switch 101 and resistance 102 with a value of approximately 25K ohms connected between the hot conductor 44 and the ground 31 which shunts the portion of the return conductor that passes through transformer 98 and such series combination is provided in order to test the conventional GFCI function. A second and optional S.P.S.T. switch 110 connected in parallel with the switching element of the relay 100 may be provided to test the controllability of the SCR circuitry by shorting leads 25 and 26 through resistance 111 which should be approximately 10K ohms. A test of controllability may also be accomplished by shorting either 25 or 26 through such a resistance to ground.

The SCR circuitry of FIG. 2 may also be provided with the optional test series combination of switch 69 and resistance 70. Leads 103 and 104 are power conductors to the amplifier 99 and leads 105 and 106 are amplifier output conductors to relay 100. The supply enclosure 52, if conductive, may be protected against accidental connection with the hot side of the line or the ground by diode 107 oriented to block forward current from the SCR 13 and to pass reverse current to the SCR and which is placed in series with variable resistance 108 of approximately one megohm to connect the enclosure with the SCR cathode conductor lead 25. The load enclosure 53 may be similarly connected unless turn-off by ground contact would be frequent and would interrupt normal function. A resistance 109 of 47K to 100K ohm is connected as a shunt across ground contacts 40, in place of capacitor 62 in FIG. 1 for the same purpose in assisting continuation of fault condition sensing capability for the SCR circuitry when contacts 40 are opened by fault. With the latching switch 66 left open, the circuit will reset and close the relay 29 when a fault of the type detectable by the SCR circuitry is cleared. As in other conventional GFCI protection, those fault conditions, including transients, sensed only by zero sequence current transformer 98 cannot continue to be monitored by the transformer system through a high resistance, such as resistance 109, which the SCR circuit employs and under most circumstances, unless transformer indications are to be ignored, the latching switch 66 should be of the spring return, normally closed type, requiring manual reset. A zero sequence current transformer 98 of FIG. 2 could be added to the circuit of FIG. 1, and the same small relay 88 energized by the sensing network could be energized by a small amplifier 99 of FIG. 2. In this instance, there would be even more duplication of fault sensing than in the circuit of FIG. 2, but it would represent a high state of the art in the field of electrical protection which might be desirable for some equipment.

Figure 3:
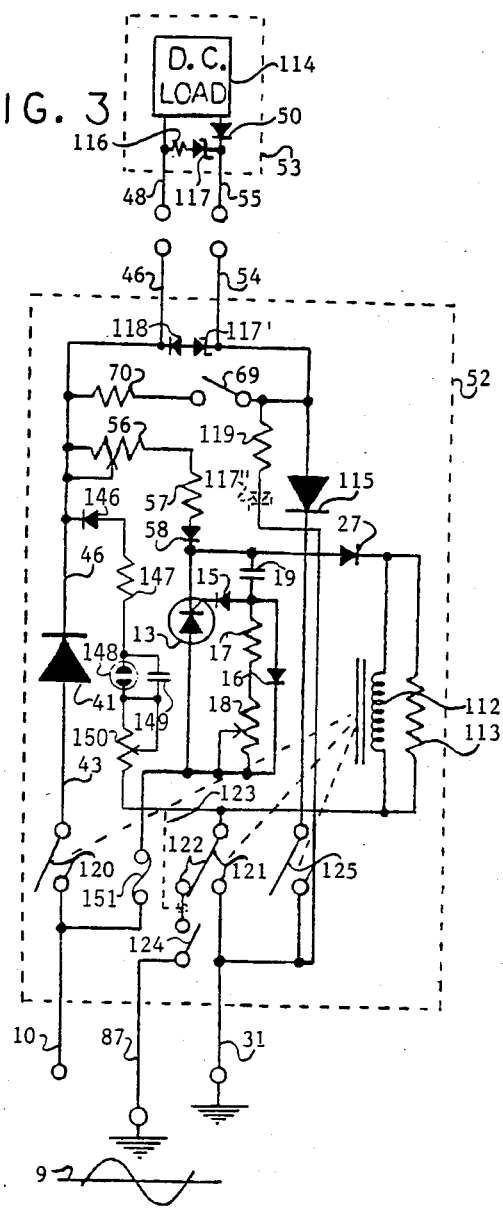
FIG. 3 is a schematic diagram of the third embodiment of circuit means for providing electrical shock and fire protection in tools or appliances which can employ half-wave pulsating D.C. current, or by division of their loads, two such embodiments may be employed to afford current flow in opposing directions, thus to employ full-wave A.C. current in the form of its two D.C. components in accordance with this invention, with protection against the hazards associated with interrupted power conductors; also including a means for positive confirmation of function with means to interrupt power if circuit becomes insensitive to fault.

Referring now to the third embodiment of FIG. 3, there is a schematic diagram which illustrates a circuit adapted to deliver half-wave current from the A.C. source 9 to D.C. load 114 through a protective control circuit which, in many respects, resembles a half section of FIG. 1 or FIG. 2. Those components which correspond in function and substantially in value to those of FIG. 1 and FIG. 2 are correspondingly numbered. It may be seen that the A.C. load 45 of FIG. 1 and 2 could be divided into two half-wave D.C. loads respectively connected to the supply by series connected rectifiers 50 and 51. The load associated load current carrying rectifier diode 50 in FIG. 3 is moved to the grounded side of the load, thus affording detection of ground fault from the hot line and from any point within the load without use of the zero sequence transformer and regardless of potential difference with ground, as well as affording line-to-line protection. This protection is thus provided even without the addition of series connected resistance and Zener diode pair 116 and 117, and Zener and rectifier diode 117' and 118 and the additional load carrying diode 115 in the supply circuit with its shunting resistance 119. These additional elements have been added to provide a line-to-ground protective response when the fault is from the continuing conductors 54, 55 on the ground side of the load and its load diode 50. This property also serves to protect against a severing of the continuing conductors 54, 55 wherein accidental conductive contact of the load connected end 55 with another source of ground to pass current in series with the load could occur and such contact could be made through the human body.

In accordance with this third embodiment of the invention, reverse current to the SCR control circuitry is blocked twice, once at the load by load current carrying rectifier 50, and again in the supply section by load current carrying rectifier 115. Each is by-passed or shunted, each such shunt comprising a resistance, or a combination of a resistance and Zener diode or a conventional rectifier and a Zener diode, or device similar to the Zener diode in properties in which current flow increases suddenly when voltage exceeds a critical level having a voltage sensitive breakdown rated at 80-90 volts and rated at approximately one watt. In each instance, the Zener diode such as 117, 117' or 117'' is oriented in the same direction as the respective load current carrying rectifiers 50 and 115 so as to provide its breakdown characteristics for applied reverse current. The conventional rectifier 118 is oriented to pass current in the direction of the reverse current, and is included only to block the passage of any possible larger currents in the load current direction through the Zener diode 117' which might damage it and may thus be replaced by a resistance as in the combination 116 and 117 having a value of approximately 56K ohms. In unfaulted normal operation, wherein rectifiers 50 and 115 are each shunted by Zener diodes, the reverse line voltage is insufficient to cause breakdown of the Zener diodes which present an additive series breakdown level of 160-180 volts and are not affected. As a convenience one of the shunting Zener-resistance or Zener-rectifier combinations may be replaced by a simple resistance such as 119 which has a value of approximately 330K ohms. An optional Zener-resistance combination adding a Zener diode 117'', as shown in broken lines, would use a resistance 119 with a lower value such as 56K ohms. If a ground contact occurs with continuing conductor 54, 55, which by-passes load carrying diode 115 together with shunting resistance 119, increased reverse voltage is applied to Zener diode 117, and when its critical voltage is exceeded, it passes sufficient reverse current to the SCR control circuitry to initiate turn-off of the relay energizing current and interruption of power to the load 114. If a line-to-line fault occurs which by-passes the load, its current carrying rectifier 50 and its resistance-Zener diode combination 116 and 117, reverse voltage furnished by a Zener shunting rectifier 115 or the resistance 119 can initiate interruption of power. In this arrangement rectifier 50 may be placed on either side of the load and on the alternative "hot" side will provide less sensitivity to capacitive leakage between the load and ground.

It should be noted that the resistance and Zener diode combination 116 and 117 are connected between conductors 48 and 55 to by-pass or shunt both the load 114 and the load carrying diode 50. In installations where the resistance and Zener diode combination 116 and 117 may not be connected, as part of a disconnected load circuit enclosed within 53 and protection against grounding contact of an unconnected line 54 as well as line 46 is desired, a duplicate of resistance and Zener diode combination 116 and 117 or a Zener and rectifier diode combination such as 117' and 118 should be permanently connected between 46 and 54 within enclosure 52 as part of the supply circuitry as shown, but may be eliminated for 240 volt systems if the fail safe oscillator device described hereinafter is employed. A resistance is preferred to the conventional rectifier in the shunts to limit forward current through the Zener diodes and is particularly useful at the load to avoid shorting through the Zener in the event of a reverse connection of the load circuit. A convenient control capability is inherent in the type of circuit shown in FIGS. 1, 2, 3 and 4, wherein a controlling device may be connected across the leads, such as leads 48 and 55, at the load to remotely control the load current from the supply by passing a very small amount of current in the reverse direction. The controlling device may be a simple switch in series with a unidirectional blocking means, oriented to pass reverse current or may be of a sensing type, such as a thermistor which varies its resistance gradually in accordance with temperature changes. If the latter type is employed, it preferably should be used in a series combination with a unidirectional blocking means or rectifier oriented to protectively pass only the reverse current, and further should be used in series combination with a Zener or other similar voltage sensitive breakown device in a trigger circuit to regulate reverse current in switch fashion and to select between full-on and full-off conditions in the supply wherever possible in effecting continuing regulations such as are required for temperature adjustments of heating elements in order to substantially avoid the interference phenomena so often anticipated when phase control is employed and to assure a more decisive relay response.

This circuit may also be employed to provide protected half-wave D.C. current but with ground fault only protection to a load that is unmodified, i.e., one which does not include rectifier 50 or resistance and Zener combination 116 and 117 in proximity to the load, which does include a rectifier 118 but not Zener diode 117' in the supply, as shown and described in FIG. 3. Rectifier 118 is retained to provide a reverse current path for ground side fault contact which becomes especially important if the ground side becomes another "hot" side and neither side is grounded as in 240 volt use. A resistance such as 56K ohms may be used in place of rectifier 118. In such a circuit arrangement in accord with this invention, protective function resembles that of the conventional GFCI in that it does not include protection against line-to-line faults, but differs in that it is more stable at higher sensitivities, monitors fault status in the off-state and automatically resets in a manner similar to the circuit shown in the schematic in FIG. 9 of U.S. Pat. No. 3,997,818. In accordance with the present invention, however, the load carrying current is carried by rectifier diode 41 and switched by D.P.D.T. relay 112 rather than carried and switched by the SCR in the prior art circuit.

Figure 4:
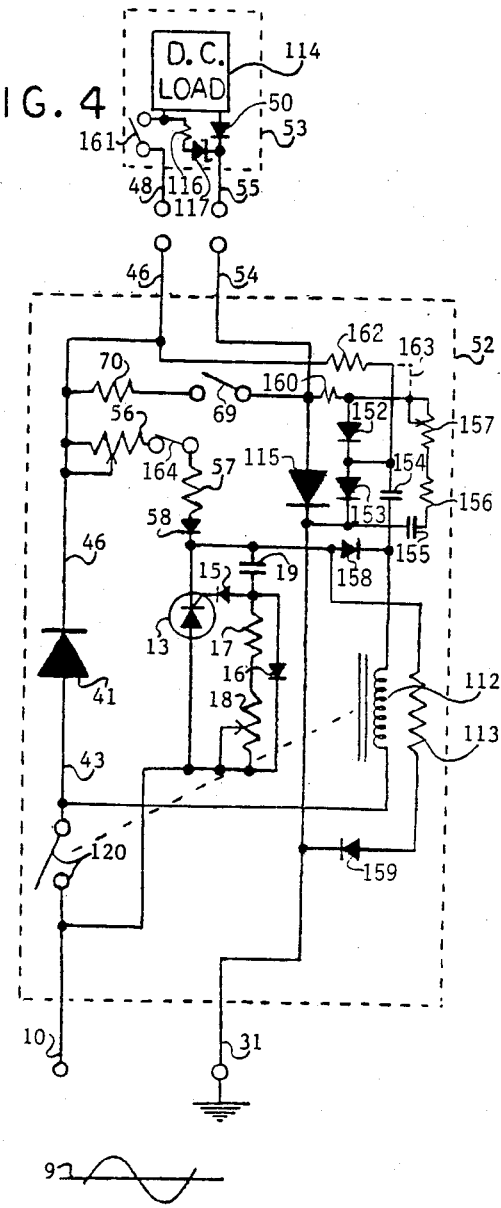
FIG. 4 is a schematic diagram of the fourth embodiment of circuit means providing protection against electrical shock and fire in the use of tools or appliances which can be powered by half-wave D.C. current, or with division of load, can be powered by full-wave current in the form of its two D.C. components as described with reference to FIG. 3, but providing special protection against the hazards associated with the severance or disconnection of live power conductors.

For loads which can function with pulsating D.C. power, and particularly those which are capable of being made functional power can be applied by utilizing two such circuits, with one oriented as shown in FIG. 3 and the other oriented as shown for the other half of the full-wave A.C. circuitry of FIGS. 1 and 2. In the circuits of FIGS. 3 and 4, in accord with this invention, the relay 112 should be of an A.C. type which will function well when energized by half-wave pulsating D.C. current and differs slightly from relay 29 of FIGS. 1 and 2 in contact arrangement. The relay 112 of FIG. 3 includes one double throw contact which replaces one of the three single throw types of relay 29. In FIG. 3, the relay coil 112 closes single throw contact pairs 120 and 125 together with contact pair 121 of the double throw contact arrangement shown as pairs 121 and 122 which are utilized to provide a protection against the possibility of accidentally misconnected hot, grounded and grounding leads in a receptacle. As current from source 9 is first applied to power 10 and 31, contact pairs 120, 121, and 125 are open and pair 122 is closed. The current to the SCR control circuit by-passes contact pair 120, but normally open contact pair 121 prevents current flow through the grounded return 31. If connections have been correctly made at the receptacle, the SCR circuit can be energized by current flow through normally closed contact pair 122 which connects to the grounding line. This flow through the relay coil 112 and optional resistance 113 is small and momentary since upon energizing the coil of the relay 112, the ground connection is transferred by armature opening of contact pair 122 and closure of pair 121, together with closure of pairs 120 and 125 which serve to complete the load current circuit. If there is a receptacle wiring error, the relay 112 will not permit use except in one instance wherein 10 is correctly hot and the grounded line 31 and grounding line 87 are reversed and in this one instance no particular hazardous effect should result for the user although the condition is electrically incorrect. If normally grounding line 87 is made hot and lines 10 and 31 are made grounded and grounding or vice versa, the relay 112 will open and close rapidly and provide audible indication. If line 31 is made hot and lines 10 and 87 are grounded and grounding or vice versa, no relay energizing will result.

Resistance 119 is connected to grounded line 31 as shown or to grounding line 87 to provide a continuous path for the small reverse current, a function similar to that provided by capacitor 62 in FIG. 1 and resistance 109 of FIG. 2. It should be understood that all possible contingencies listed are not considered equal probabilities; that the reversal of hot and grounded leads is considered the more common error.

Switch 124 provides a latching mode to the circuit. If switch 124 is kept closed, automatic reset will occur upon clearing of the fault. If closed momentarily to reset and then left open, manual reclosing will be required for reset. If the latter latching mode is desired, and there is no need or desire for automatic reset, optional connection 123, shown in broken lines, can be made; the switch 124 may be made a normally open, momentarily closed, spring return type, and the contact pair 122 of relay 112 may be eliminated. When confirmation of correct receptacle connection is not needed, completion of the relay coil circuit to ground may be accomplished by connection to conductor 31, instead of conductor 87, through switch 124 to provide selection between automatic reset and manual reset latching modes, or if latching is not desired, by direct connection to 31 and contact pairs 121 and 122 may be eliminated in the relay.

The resistance 113 of FIG. 3 which is connected in parallel with the relay coil 112 is a power resistor that serves as a dummy load to adjust the load of fuse 151 as part of a fail safe arrangement but also serves when needed to provide a reverse current path like a "free wheeling diode" across the relay coil inductance. This resistance 113 may be a filament bulb which can serve as an indicator and provides visual confirmation of protective function as well, or the resistance may include a parallel connected lamp of various other types for such visual confirmation.

An optional performance quality indicator and "fail safe" arrangement is included in FIG. 3, which employs a means for controllably depressing or attenuating the output of the SCR 13, to the relay coil 112 as a result of the gate response to reverse current, and in a manner that facilitates visual recognition and assurance of such proper SCR reaction when an indicator, such as a lamp, is included in the relay coil circuit. The attenuation of the output must not reduce relay coil current below holding requirement, but must be substantial to achieve proper results. As shown in its application to the circuit of FIG. 3 a relaxation oscillator circuit comprising rectifier 146, fixed resistance 147, neon tube 148, capacitor 149, and adjustable resistance 150 provide a source of pulsating reverse current from ground to lead 46, and if resistance 113 is a lamp, or a composite resistance including a lamp, confirmation of the SCR's ability to respond to the presence of reverse or fault current will be provided. Correct response to reverse current would be indicated by pulsing illumination from the lamp. Failure to respond for any reason would be indicated by uniform full half-wave lamp ullumination. Such failure could be due to defect in the SCR 13 itself or an external malfunction such as shorted failure of the rectifier diode 41 which would shunt reverse current and prevent SCR reaction. A positive and automatic feature of the fail-safe system is produced when the relay coil circuit load is adjusted to be within the current carrying limits of fuse 151 when depressed or attenuated and to be beyond the current carrying limits of fuse 151 when not depressed. The relay coil circuit will then be automatically interrupted by opening of the fuse 151 in the event of failure to react to reverse or fault current. The resistance 113 can be selected to adjust the coil current load so as to be within the current carrying range of a commercially available fuse as the most convenient means of achieving the proper load and fuse relationship.

The fuse 151 should normally be of a small current capacity slow-blow type in order to avoid premature or erroneous reaction to brief surges which may be encountered, particularly when a lamp filament may be a large part of the coil current load resistance 113.

This type of fuse also tends to react to averages of pulsing current rather than peaks. A negative thermal coefficient resistance may also be employed in limiting surges to faster melting fuse elements. When the lamp comprises a substantial portion of the load 113 and assists substantially in relay function, a sensitive adjustment provides that the relay will turn off as a result of lamp failure so that the fail-safe system is not compromised by such a possibility. The system may be employed for automatic monitoring of performance without visual indicator in which case the lamp could be eliminated as part of the load 113 and the oscillator comprising neon tube 148 and capacitor 149 eliminated in the attenuating of the output from SCR 13, in favor of simpler control by values of resistances 147 and 150 or of 119. The "fail-safe" combination of the attenuated output of an SCR 13 and predetermined load related to the capacity of its fuse or other overload sensitive circuit breaking means can be employed directly as a load power supply with or without pulsing effect where attenuated illumination is acceptable or where pulsating light may be particularly desirable as in the instance of Christmas tree and other display lights. Where there might be occasion to add to the load or reduce load resistance, as in adding to a string of Christmas tree lights, the additional string could include additional means to reduce resistance to the reverse current and further attenuate the SCR output to keep the current through the circuit breaking means substantially unchanged and within its ability to carry current.

In application of the performance quality indicator and "fail-safe" system to full wave circuits such as that of FIG. 1, an alternative to the relaxation oscillator addition may be used to achieve a visible comfirmation of function. A pulsating or intermittent attenuation in the relay coil circuit can be produced by connecting a large leakage resistance of suitable value, such as 1 MEG ohm or more from a hot power lead to ground. This becomes notable in the illumination of a lamp which is connected through a rectifier diode and in parallel with the relay coil. The pulsing which occurs is notable in the lamp brilliance regardless of the hot lead selected for leakage connection to ground and regardless of the polarity of the lamp diode in this combination which shunts the relay coil.

In using the half-wave circuit in pairs of full-wave powering of the aforementioned loads, which are capable of division, such as heating elements, etc., it is advantageous in most instances that the more common faults, like ground faults, will cause turn-off of only one half of the circuit and leave the other half fully operative. It is also advantageous to employ two half-wave D.C. circuits rather than one A.C. circuit where capacitive leakages are anticipated and.or such D.C. usage is particularly feasible as with heating elements, filament lamps, rectifier coupled halogen lamps, and the like. With appropriate component value adjustments, or in some instances simple connective modifications, this type of circuit is readily adaptable to higher voltage circuits. For 240 line to line voltage in which neither side of the line is grounded but either line to ground voltage is 120 volts, contact pair 125 can simply be disconnected from grounded line 31 and reconnected to the other hot line to provide protected 240 volt half-wave current to load 114. Values of resistance 116 and either of the Zener diodes 117 and 117' need not be altered nor the values of other components other than the value of the load current rectifiers 41, 50 and 115 if they are not rated to accept the voltage increase. Switch 124 should also be connected to grounded line 31 if grounding line 87 is not available in the 240 volt instance.

In a higher voltage installation in which one side of the line is grounded, connections would be originally described for 120 volts, but component values appropriately would need to be altered. In instances such as the 240 volt usage, both sides of the line must be broken in the fault protection and this is accomplished in accordance with this invention.

Reference is now directed to the fourth embodiment of the invention shown in FIG. 4 in which line-to-line and line-to-ground protection from fault contact is substantially the same as that provided by the circuit of FIG. 3 but with interrupted conductor fault protection which is additional to that of FIG. 3. In instances where the ground side conductors 54-55 may be disconnected while the hot side conductors 46-48 remain connected, protection is provided by circuits of FIG. 3 and FIG. 4 against accidental connection to a source of ground potential other than the return or neutral conductor such as might occur through the human body and which would place the body in a series connection to the load and its unidirectional blocking means. The circuit of FIG. 4 however provides additional and unusual protection against the possibility of placing the body on other improperly connected conductive objects in series with the load even when the connection is made between the ground side return lead 55 connected to rectifier 50 and load 114 and its supply connected return lead continuation 54 or between hot side lead terminal 46 and 48 when the ground side leads are still connected. The FIG. 4 circuit is designed to reject loads having a resistance greater than a determinable level such as 500 ohms, so that no relay closure occurs to provide load current to a higher resistance. Automatic interruption of the current to the relay 112 is provided and the relay contacts 120 open to interrupt the load current in the event that such greater resistance occurs due to an increase after load current flow is initiated by relay closure in response to a low resistance. If load conductors, such as 46 and 48, are disconnected from each other while a fault conductor of higher resistive value, such as the human body, still connects 46 and 48 in a position as to provide an alternate path and receive the flow of current from the hot side and through the load to ground, the relay will open. Reconnection of the conductors to establish a low resistance while the higher resistance connection remains, does not reactuate the relay. Disconnection of the higher resistance which is recognized as a fault is required before reconnection of the conductors and establishment of a low resistance path will cause relay closure. A person can thus disconnect and reconnect a current carrying conductor without the normal hazard associated with conductor contact whigh might place a portion of the body in a series position with the load by contact with both exposed conductor ends. Protection against such inadvertent series positioning in prior U.S. Pat. No. 3, 997, 818 employed a time delay mechanism to provide full current only after a reduced current flow had been established for a substantial period.

Of course, any direct conductive contact between the hot conductor 46 and earth ground or the return conductor that might also occur as a simultaneous fault would cause protective turn-off as already described with reference to FIG. 3. Reset after a fault reaction and fault correction are remotely accomplished at the load in the absence of a fault by opening and reclosing load switch 161 or at the supply circuit by momentarily opening the normally closed reset switch 164. The circuit is particularly adaptable to distribution systems wherein the conductors 46–48 and 54–55 would be extended as transmission lines and made subject to damage which could include severance. Where earth ground is to be employed as a return path, the source conductors represented by 10 and 31 should be connected to a generating means or transformer secondary isolated from earth ground and such earth ground return established by grounding leads such as 54 and 55 at the supply and load ends respectively. In the circuit of FIG. 4, turn-off in the event of ground side contact with conductor 54 in the absence of a connected load is accomplished without the addition of a reverse current path, such as is provided by rectifier diode 118 of FIG. 3, or a resistance substitute and a Zener diode such as 117'. Turn-off action of the FIG. 4 circuit is particularly crisp and decisive. An indicator lamp, included as part of the resistance 113, indicates a full on or full off as the two alternate SCR output conditions in the functioning of the circuit. Resistance 113 in such a circuit, although connected differently, also assists in relay function and, as in the circuit of FIG. 3, if a lamp is used in a properly adjusted circuit, the relay will open if the lamp filament burns out. If both rectifier diode 152 and 153 were of load carrying capacity, rectifier diode 115 and resistance 160 would be eliminated, but in the interest of economy and to avoid using an additional large capacity rectifier, diodes 152 and 153 are connected in parallel with rectifier diode 115, such diodes having a relatively small current capacity type such as the readily available general purpose 1 to 2.5 ampere 1000 PIV types while the larger rectifier 115 carries the load current. Resistance 160 is not critical but is in the low ranges 1 to 2K ohms which would serve to assure that the heavy current is carried by the lower resistance path through rectifier diode 115. In initial turn-on with leads 10 and 31 connected to the source, load switch 161 is closed and in the absence of fault, initial relay coil current passes through the load 114 from line 10 to grounded line 31, and after closure of relay contact pair 120, a holding current is maintained by charging of capacitor 154 connected to grounded line 31 by rectifier diode 153, via current from SCR 13, and subsequent capacitor discharge through relay coil 112, through the load 114 and back to capacitor 154 through rectifier diode 152. Capacitor 155, fixed resistance 156, and adjustable resistance or, potentiometer 157 which shunts the rectifier pair 152 and 153 and and rectifier 115 furnish reverse current to ground side conductors 54–55 necessary for line-to-line fault detection. While sensitivity of the SCR circuit is adjustable using resistances 18 and 56, these are preferably pre-set for a suitable sensitivity range with finer adjustements made by using potentiometer 157. Resistance 162 connects from the point between rectifier diodes 152 and 153 to the hot lead 46 in an arrangement which can provide reset at the supply by normally closed, momentary open, reset switch 164, but which permits remote reset by simply opening and closing the load switch 161 or reconnecting disconnected leads in the absence of a fault. If it is preferred that a manual reset after reaction be more conventionally required to be made at the supply circuit, resistance 162 should be disconnected from the connection between 152 and 153 and reconnected as shown by the dotted line 163 which connects it across leads 46 and 54 through small value resistance 160.

This reconnection produces a latching effect in turn-off and reset is accomplished by momentarily opening of reset switch 164. The reset switch may alternatively be placed in series with capacitance 155 and resistances 156 and 157. Values of prototype components in FIG. 4 not previously described for FIG. 4 or previously shown and described due to their inclusion in circuits of other figures are as follows: Resistances, ½ watt, 162–33K to 100K ohms, 156–10K to 15K ohms, 157–20K to 50K ohms, 160–500 to 2000 ohms; Rectifier diodes 152, 153 and 159, the same general purpose type as 152 and 153; and Capacitors 154 and 155 approximately 0.1 MFD. 400 volt.

Where full wave A.C. is to be supplied by a pair of reverse oriented circuits like that of FIG. 3 or FIG. 4 the A.C. may be reconstituted by use of a rectifier bridge in the load like that comprised by 50 and 51 in FIG. 1, but to be operable, requires that the A.C. load be separately connected on the ground side and that connection through the return leads such as 54 in FIGS. 3 and 4 be avoided since the grounded leads are sensitive to connection with ground other than through the supply circuit diodes.

In such circuits wherein full-wave A.C. is supplied to the load, the two half-wave circuits must have a reversible master-slave relationship and this can be accomplished, as it is in FIGS. 1 and 2, by the addition of a bridge which may include resistances 32 and 33, capacitor 34 and gas filled tube 35. An alternative arrangement, which may be used with some success, includes connecting the A.C. powered relay coil 112 to ground through a series connected capacitor and power resistor so that turn-off of one half-wave D.C. supply leaves only half-wave D.C. from the other half-wave supply which is substantially blocked by the capacitor and results in a deenergization of the relay coil 112 which opens the contacts of the relay.

Figure 5:
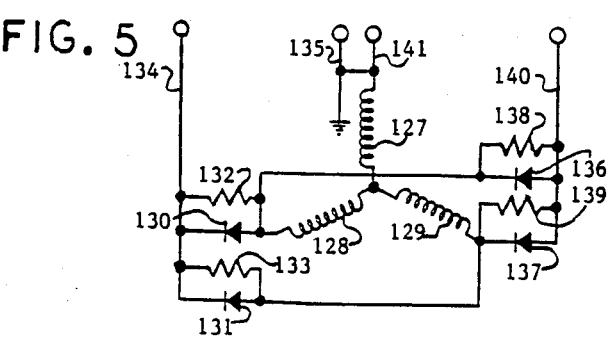
FIG. 5 is a schematic diagram for increasing the percentage of the "on" state time of current flow in the half-wave embodiment of FIGS. 3 and 4 in accordance with this invention.

Referring now to FIG. 5, a schematic drawing illustrates a circuit in its simplest form to show a polyphase mixing means which will supply current to the half-wave circuits, such as those of FIGS. 3 and 4, and has a greater proportion of forward conduction time relative to the time available for reverse current flow in order to increase the power supplied through such circuits to the load. While the frequency of reverse current availability should not be diminished in order to maintain speed of response which requires commutation of any SCR in the disclosed circuits, the time available to reverse current flow need not be equal to that used for forward current load current conduction, and this circuit exemplifies a means for increasing the percentage of time allotted to load current conduction. In FIG. 5, windings 127, 128, and 129 are the three wye connected windings (not limited to wye) of a transformer or generator source of threephase current. Load current carrying rectifier diodes 130 and 131 connecting windings 128 and 129 to conductor 134 which is adapted to be connected to conductor 10 of FIG. 3 or FIG. 4 and one watt resistances 132 and 133 of approximately 27K ohms shunt the diodes 130 and 131, respectively. The third winding 127 is connected directly to conductor 135 which may also be connected to earth ground or in isolation arrangements to a chassis, etc., and which may be adapted by line 135 to be connected to conductor 31 of FIG. 3 or FIG. 4. To similarly supply a second half-wave circuit like that of FIG. 3 or FIG. 4, but oriented to carry a load current in an opposite direction, a second pair of load current carrying diodes 136 and 137 connect windings 128 and 129 to conductor 140 which is adapted to be connected to the hot lead of the reverse oriented circuit. By-pass or shunting resistances 138 and 139, are resistances similar to resistances 132 and 133. Coil 127 is provided with a second conductor 141 for connection to the ground side of the reverse oriented circuit. Capacitors may be employed in place of the resistances 132, 133, 138, and 139, but are not preferred. The two protective circuits and their loads may be fed simultaneously from the same transformer or generator. It is to be understood that in the case of polyphase mixing turn-off will not be initiated by conduction between the two hot sides, of two reverse oriented circuits which are like those in FIG. 3 or FIG. 4 as it is when such circuits are fed from a conventional A.C. source like source 9.

Figure 6:
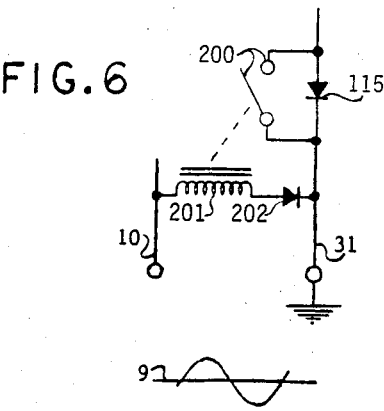
FIG. 6 is a schematic diagram showing a synchronous switching means connected to assist a conventional rectifier during forward conduction to reduce heat generation; and the need for heat sinking devices.

Turning now to FIG. 6, an electromechanical conducting and blocking means is shown which is especially applicable to the needs of load current rectification peculiar to this invention. Such means, shown in FIG. 6 with connections indicating use as a current carrying and blocking means to assist rectifier 115 as included in the circuit of FIG. 3, comprises a relatively simple synchronous switching arrangement of vibratory or rotary type which can protect against surge damage and either reduce or substantially avoid the generation of heat in forward current conduction and eliminate the necessity of heat sinking for heavier currents in accomplishing the quality of load current rectification required by this invention. In a vibratory example, normally open contacts of contact pair 200 are closed during the forward current half-cycle by current through d.c. type coil 201 which is supplied with half-wave forward current by connection through conventional rectifier 202 to leads 10 and 31 from the a.c. source 9. If normally closed contacts are desired to be used, rather than normally open contacts, the rectifier 202 should be reverse to supply contact opening current during the reverse current half cycle. If the synchronous switching reaction is such that opening and closing of the contacts is slightly delayed in each of the two half cycles, closing after the forward current half cycle has begun and opening after the reverse current half cycle has begun, a brief initial forward current will be carried by the rectifier 115 and a small initial reverse current will be permitted to pass through the contact paid 200. The forward current carried by rectifier 115 is greatly reduced by the contact pair 200 and its current capacity and heat sink requirements are correspondingly reduced. The initial reverse current carried by the contact pair 200 tends to be of relatively low voltage which can be tolerated by the system without initiating turn-off. Contact arcing in closing is eliminated by the shunting conduction of rectifier 115 and eliminated in opening by the reverse current blocking of means 41 and 50. The entire reverse half-cycle can be blocked in a normally open arrangement of contact pair 200 by combining a slightly delayed contact closing during the forward current half-cycle with an early contact opening, one which occurs before the end of the half-cycle so that both closing and opening are within the same forward current half-cycle, The entire forward current can be carried by the contact pair 200 and rectifier 115 of FIG. 6 eliminated in a normally closed arrangement of the contact pair, by combining a slightly delayed contact opening during the reverse current half-cycle with an early contact closing, one which occurs before the end of the half cycle, so that both opening and closing are within the same reverse current half-cycle. The reverse current conduction through the contact pair would be increased but without increasing the voltage. The synchronous contacts avoid arcing if switching occurs during the forward half-cycle only when the contacts are connected in parallel with a rectifier, such as 115, and they avoid arcing if switching occurs during the reverse current half cycle only if the contacts have a series connection with other reverse current blocking means which are blocking except for minute intentional shunt currents at the moment of switching. Avoidance of arcing extends contact life immensely, substantially avoids r.f. generation in the switching, permits minimal contact spacing for fast response, reduced sound and reduced armature motion. The magnetic efficiency of the electromechanical blocking means is enhanced and permits the use of a smaller coil and armature size relative to contact size.

In a circuit such as that of FIG. 3, the electromechanical blocking means or blocking means combination 200-202 of FIG. 6 may be used in all instances of the three load current blocking means positions to replace rectifiers 41, 50 and 115, but the total arrangement should be such that the aforementioned conditions that afford avoidance of contact arcing are met. The parameters of the coil and core and the means for urging armature return such as a spring, or the like in conventional vibratory and rotary switching devices may be a factor in regulating the delayed and advanced switching characteristics which cause opening and closing of contacts within the same halfcycle and assist in making the synchronous switching device a useful part of this invention.

While this invention has been described with respect to certain specific embodiments, it will be appreciated that many modifications and changes may be made by those skilled in the art without departing from the inventive concepts or spirit of this invention. It is intended, therefore, by the appended claims to cover all such modifications and changes as fall within the true spirit and scope of the invention.

What is claimed as new and what is desired to be secured by Letters Patent of the United States is:

1. In a power system the combination comprising a load and a first current blocking means connected in series to said load for passing substantial current in one direction through said load and passing substantially less current in the opposite direction, and a supply circuit connected to said load and adapted to connect said load to an alternating current source, said supply circuit including a second current blocking means for passing substantial current in said one direction through said load and passing substantially less current in said opposite direction, said supply circuit having a load current relay connected between said alternating current source and said load for supplying said substantial current from the alternating current source to load in said one direction through said first and second current blocking means, said supply circuit further including a unidirectionally triggered switching means connected between said alternating current source and said load for receiving current in a direction opposite to said one direction and connected between said alternating current source and said load current switching means to supply actuating current in said one direction to said load current relay, said load current relay being controlled by current from said unidirectionally triggered switching means, said supply circuit further including control means operatively connected in parallel to said undirectioinally triggered switching means for activating and deactivating said unidirectionally triggered switching means and substantially reducing said actuating current to said load current relay through said undirectionally triggered switching means and substantially reducing said substantial current in said one direction supplied by said load current relay whenever a load providing current flow in said opposite direction is connected to said supply circuit.

2. The system as defined in claim 1 wherein said undirectional triggered switching means is a silicon controlled rectifier.

3. The system as defined in claim 1 wherein said unidirectionally triggered switching means is a thyristor.

4. The system as defined in claim 3 wherein said control means for substantially reducing the current flow includes a capacitor in triggering the gate of said thyristor, said capacitor discharging below the firing potential whenever a load circuit providing current flow in said opposite direction is connected to said supply circuit.

5. The system as defined in claim 1 wherein each of said first and second blocking means is a rectifier.

6. The power system as defined in claim 1 in which said first current blocking means is located in said supply circuit separable from said load.

7. The power system as defined in claim 6 further including a resistance connected in parallel with said load to provide an additional path for current flow in both said directions.

8. The power system as defined in claim 7 wherein said resistance is located in said supply circuit.

9. The power system as defined in claim 1 further comprising a third current blocking means connected in parallel with said load and having a forward current direction and a blocking direction opposed to the blocking direction of said first current blocking means, said third current blocking means providing a path for current to pass to said unidirectionally triggered switching means in said opposite direction.

10. The power system as defined in claim 9 wherein said third current blocking means is located in said supply circuit.

11. The system as defined in claim 9 wherein said third blocking means is a rectifier.

12. The power system as defined in claim 1 in which said relay closes a pair of contacts when energized and completes an energizing current path for said relay by contacting a grounded conductor from the alternating current source, said relay having an additional energizing path by contact with a ground conductor when not energized.

13. The power system as defined in claim 1 in which said relay closes a pair of contacts when energized and completes a normal energizing current path to ground for said relay by connection to a ground conductor from the alternating current source without connection to a grounding conductor, an initial energizing current path to ground for said relay being provided by contact with a grounding conductor to permit a momentary initial energizing current for said relay prior to establishment of said normal energizing current path.

14. The power system as defined in claim 1 in which said relay includes a pair of contacts closed when energized for completing a first energizing current path by connection to a grounded conductor from the alternating current source, said relay having another pair of contacts momentarily connected when energized for completing a second initial energizing current path by connection to a grounding conductor, said first and second energizing current paths being independent and non-operative at the same time.

15. The power system as defined in claim 1 wherein current flow in said opposite direction is caused by a fault, further comprising means to produce said fault detectable by said system in response to another fault not causing current flow in said opposite direction in order to make said other fault detectable by said system, said means including a zero sequence current transformer surrounding the current carrying conductors from the alternating current source to said supply circuit for producing a current in the coil of said transformer when an inequality in the amount of current carried by said conductors results from a ground fault, means for amplifying said current produced in said transformer to energize said means to produce a said fault supplying current flow in said opposite direction and to thereby actuate said control means.

16. The power system as defined in claim 15 in which said means to produce said fault is another relay.

17. The system as defined in claim 1 further comprising a third current blocking means in said supply circuit for passing substantial current in said one direction through said load and passing substantially less reverse current in said opposite direction, said second current blocking means connecting one conductor of the alternating current source to said load and said third current blocking means connecting the other conductor of said current source to said load, said third current blocking means and said first current blocking means connected to pass current in said one direction, each said current blocking means including a voltage breakdown means having a reverse current voltage breakdown characteristic wherein substantially less voltage than the voltage provided by the alternating current source initiates reserve current conduction therethrough, said breakdown means of said first and third current bocking means in series having a combined total voltage requirement for initiation of reverse current flow substantially exceeding the voltage supplied by the alternating current souce so that shunting of one of said first and third current blocking means and included breakdown means reduces said total voltage requirement to a level which permits reverse current flow through said breakdown means included in said other of said first and third current blocking means.

18. The system as defined in claim 17 wherein each said voltage breakdown means is a Zener diode.

19. The system as defined in claim 1 further comprising a third current blocking means in said supply circuit for passing substantial current in said one direction through said load and passing substantially less current in the opposite direction, said second current blocking means connecting one conductor of the alternating current source to said load and said third current blocking means connecting the other conductor of said current source to said load, a voltage breakdown means shunting one of said third and first current blocking means and a resistance shunting the other of said first and third current blocking means and connected to pass current in said one direction, said breakdown means having a reverse current voltage breakdown characteristic wherein substantially less voltage than the voltage provided by the alternating current source initiates reverse current conduction therethrough, said breakdown means having a voltage requirement for initiation of substantial reverse current flow which exceeds the voltage supplied to the voltage breakdown means by the alternating current source through said resistance so that shunting of said resistance applies higher voltage to said breakdown means to initiate substantial reverse current flow and shunting of said voltage breakdown means permits reverse current flow through said resistance.

20. The system as defined in claim 19 wherein said voltage breakdown means is a Zener diode.

21. A power system comprising a load connected to a supply circuit, said supply circuit including a load current relay connected between an alternating current source and said load for supplying full-wave current to said load, said system including two pairs of current blocking means with each pair connected in series between the alternating current source and said load, one pair of said blocking means passing one half cycle of said current from the alternating current source to said load, the other pair of said blocking means passing the other half cycle from the alternating current source to said load whereby substantially full wave current is delivered to said load from the alternating current source, said system including a pair of unidirectionally triggered switching means connected between the alternating current source and said load for supplying actuating current to said load current relay one of said unidirectionally triggered switching means passing one-half cycle from the alternating current source in one direction and the other of said unidirectionally triggered switching means passing the other half-cycle of current from the alternating current source in a direction opposite said one direction, each said load current switching means being controlled by current from its respective said unidirectionally triggered switching means, at least one of said unidirectionally triggered switching means supplying its said half-cycle of current from the alternating current source as current to actuate said load current relay, said supply circuit including a control means respectively connected in parallel to each of said unidirectionally triggered switching means connected to the alternating current source to provide activating trigger current in each of said directions to respective said unidirectionally triggered switching means, said control means substantially reducing said trigger current to respective said unidirectionally triggered switching means and thus reducing the current supplied to actuate said load current relay whenever a current flow opposite to a said one direction is provided to said control means connected to said unidirectionally triggered switching means or in said one direction to said control means connected to said other unidirectionally triggered switching means by a connection that shunts one of said current blocking means to cause said load current relay to substantially interrupt the current supplied to said load.

22. The system as defined in claim 21 wherein one of each of said pairs of current blocking means is connected to said load outwardly of said supply circuit.

23. The system as defined in claim 21 wherein the other of each of said pairs of current blocking means is within said supply circuit.

24. The system as defined in claim 21 wherein both of said pairs of current blocking means is within said supply circuit.

25. The system as defined in claim 21 wherein a third current blocking means is provided to each said pair of current blocking means and at least one said third current blocking means is connected to supply actuating current to said load current switching means.

26. The system as defined in claim 25 wherein both of said third current blocking means are connected to respective said unidirectionally triggered switching means for supplying current to actuate said load current switching means.

27. The system as defined in claim 21 in which said load current switching means is a relay.

28. The system as defined in claim 21 in which each of said unidirectionally triggered switching means is a thyristor.

29. The system as defined in claim 28 further comprising two additional current blocking means, a load means connected by said two additional current blocking means to said unidirectionally triggered switching means to supply current from said source to said load means, said load means enhancing the firing and commutation of said unidirectionally triggered switching means.

30. The system as defined in claim 29 in which said load means is a gaseous discharge bulb and a resistance connected in series.

31. The system as defined in claim 29 in which said load means is a capacitance and a resistance.

32. The power system as defined in claim 21 wherein current flow in said opposite direction is caused by a fault, further comprising means to produce said fault detectable by said system in response to another fault not causing current flow in said opposite direction to make said other fault detectable by said system including a zero sequence current transformer surrounding the current carrying conductors from the alternating current source to said supply circuit for producing a current in the coil of said transformer when an inequality in the amount of current carried by said conductors results from a ground fault, means for amplifying said current produced in said transformer to energized said means to produce a detectable fault condition and to thereby actuate said control means.

33. The power system as defined in claim 32 in which said means to produce said fault is a relay.

34. In a power system having a load circuit including a load and a current blocking means connected in series to said load for passing substantial current in one direction through said loads and passing substantially less current in the opposite direction, and a supply circuit connected to said load circuit and adapted to connect said load circuit to an alternating current source, said supply circuit including a unidirectionally triggered switching means for supplying current from an alternating current source to said load circuit in said one direction, said supply circuit further including control means operatively connected to said unidirectionally triggered switching means for substantially reducing the current flow through said unidirectionally triggered switching means in said one direction whenever a load circuit providing current flow in said opposite direction is connected to said supply circuit, the improvement wherein said load comprises a relay having greater current carrying capacity than said undirectionally triggered switching mean to supply current to another load from an alternating current source, said load further including one current blocking means to pass current in said one directional through said other load and substantially no current in said opposite direction, said other loading including another current blocking means to pass current through said other load in said one direction and substantially no current in said opposite direction, coupling means for connecting said control means between said one and other current blocking means to pass current in said opposite direction provided by a shunting connection of said other blocking means included in said other load for substantially reducing the current flow through said switching means to said relay to interrupt flow of current from said source to said other load.

35. The system as defined in claim 34 further comprising coupling means including a resistance coupled between said other switching means and said reducing means.

36. The system as defined in claim 34 further comprising coupling means including a current blocking means coupled between said control means and said other switching means oriented to pass current in said opposite direction and substantially reduce current in said one direction.

37. The system as defined in claim 34 wherein said current limiting means includes a resistance.

38. The power system as defined in claim 34 wherein said alternating current source is a polyphase source, said source including a plurality of current blocking means connected to pass current from at least two conductors from said polyphase source to a common output terminal in which at least one such conductor from said current source is connected to another terminal without passing through said plurality of current blocking means, and shunting means for each of said plurality of current blocking means for passing a small current in the direction in which current is blocked by said plurality of current blocking means to provide less than complete half wave rectification of said polyphase current and to provide a relatively small current in the opposite direction where forward current rectification is incomplete.

39. The power system as defined in claim 38 in which said shunting means includes a resistance.

40. The power system as defined in claim 38 in which said shunting means includes a capacitance.

41. The power system as defined in claim 38 wherein the conduction time of forward current to said load is increased and the conduction time of reverse current is reduced without adversely effecting the protective properties afforded by the flow of reverse current when induced by fault in the system.

42. The system as defined in claim 1 further comprising a third and fourth current blocking means for passing substantial current in a direction opposite said one direction through said load and passing substantially less current in said one direction, whereby substantially full wave current is delivered to said load from the alternating current source, said system including another unidirectionally triggered switching means connected to the alternating current source for supplying actuating current to said load current switching means, one of said unidirectionally triggered switching means passing one-half cycle from the alternating current source in said one direction and the other of said unidirectionally triggered switching means passing the other half-cycle of current from the alternating current source in a direction opposite said one direction, either or both of said one and the other unidirectionally triggered switching means supplying current from the alternating current source as current to actuate said load current relay, said supply circuit including another control means operatively connected to said other unidirectionally triggered switching means for substantially reducing said actuating current to said load current relay through said other unidirectional triggered switching means whenever a current flow in said one direction is provided to said other control means, either or both of said one and other unidirectionally triggered switching means substantially reducing actuating current to said load current relay by a connection that shunts one of said current blocking means to cause said load current relay to substantially interrupt the current supplied to said load.

43. The system as defined in claim 42 in which each said unidirectionally triggered switching means is a thyristor.

44. An electrical circuit for rectification of an alternating electrical current passing sustantial current in one direction during one half-cycle and substantially less current in the opposite direction during the other half-cycle, comprising a rectifier means and a synchronous switching means connected in parallel to said rectifier means, said switching means being operable to close and shunt said rectifier means during and near the beginning of said one half-cycle and to open during and near the end of said same one half-cycle thereby enhancing the forward current conduction in said one direction through said circuit and reducing current through said rectifier means and substantially eliminating any arcing in current by said switching means during closing and opening thereof.

45. In a power system having a current load element and circuit means connected to said load element and adapted to connect said load element to an alternating current source, said circuit means including a unidirectionally triggered switching means connected between said load element and one terminal of an alternating current source for supplying current from an alternating current source to said load element in one direction, said system including a current blocking means, said circuit means further including means operatively connected to said undirectionally triggered switching means and said one terminal of an alternating current source and connected to another terminal of an alternating current source through said current blocking means for supplying triggering current in said one direction to turn-on said unidirectionally triggered switching means, said means operatively connected to said undirectionally triggered switching means being operative substantially to reduce the current flow in said one direction through said undirectionally triggered switching means whenever a current flow in the opposite direction is provided by an shunting connection of said current blocking means permitting minor current flow in both said directions through said means operatively connected to said undirectionally trigger switching means to initiate and maintain turn-off thereof, the improvement wherein said alternating current source is a polyphase source, said source including a plurality of current blocking means connected to pass current from at least two conductors from said polyphase source to a common output terminal in which at least one such conductor from said current source is connected to another terminal without passing through said plurality of current blocking means, shunting means for shunting said plurality of current blocking means for passing a small current in the direction in which current is blocked by said plurality of current blocking means to provide less than complete half wave recitification to said polyphase current and to provide a relatively small current in the opposite direction where forward current rectification is incomplete.

46. The power system as defined in claim 45 in which said shunting means includes a resistance.

47. The power system as defined in claim 45 in which said shunting means includes a capacitance.

48. The power system as defined in claim 45 wherein the percentage of forward conduction time of current to said load is increased while continuing to supply an availability of reverse current and thereby maintaining the protective properties afforded by the flow of reverse current when induced by fault in the system.

49. In an electrical power circuit adapted to be connected to a source of alternating current for supplying substantial current to a load, a resistance network connected between first and second conductors from said source for developing a small current to indicate connective fault conditions and to initiate protective interruption of said substantial current to said load, said network including two directional resistance means for providing high resistance to a sensing current passing in one direction and low resistance in the other direction, each said directional resistance means being oriented in the same direction between said conductors to provide said high and low resistance to said sensing current flow, and a relay connected between said source and said load responsive to said small current from said resistance network for interrupting said substantial current flow from said source to said load.

50. The power circuit as defined in claim 49 wherein each of said directional resistance means has a resistance to current passing in said one direction which is substantially less than the resistance presented by a rectifier in its blocking direction.

51. The power circuit as defined in claim 49 wherein each said directional resistance means includes a current blocking means and resistance connected in parallel.

52. The power circuit as defined in claim 49 wherein said second conductor is a grounding conductor, a third conductor from said source being a grounded conductor, one said directional resistance means being connected to said first conductor and said other directional resistance means being connected to said second conductor, a common resistance connecting said two directional resistance means together.

53. The power circuit as defined in claim 52 further comprising a series connected resistance and current blocking means connecting one said directional resistance and common resistance to an indicator terminal, said series resistance and current blocking means oriented to pass current in said other direction of low resistance of said one directional resistance means and to pass current between said first conductor and said indicator terminal in said other direction and to block current between said indicator terminal and said first conductor through said one directional resistance in said one direction.

54. The power circuit as defined in claim 53 wherein said other directional resistance and said common resistance are connected to another indicator terminal.

55. The power circuit as defined in claim 54 further comprising a second current blocking means connected by a sensor lead from said one indicator terminal to said third conductor, said second current blocking means being oriented to pass current to said third conductor from said sensor lead in the direction of low resistance of said one directional resistance, wherein contact between said sensor lead and either conductor of said source, or the ground to which said third conductor is directly or indirectly connected or a discontinuance in the connection of said resistance network to said conductors from said source other than said first conductor develops a current across said indicator terminals.

56. The power circuit of claim 55 further comprising an electrically conductive means in proximity to said load, said sensing lead being connected to said conductive means wherein an indicator current is developed across said indicator terminals as a result of conductive contact between said conducting means and either conductor of said source or the ground to which said third grounding conductor is directly or indirectly connected and as a result of a discontinuance in the connection of said resistance network from said source other than said first conductor or as a result of a discontinuance in said other conductor connection with said load.

57. The power circuit as defined in claim 56 wherein said sensor lead is connected to said conductive means, a third current blocking means adapted to pass current from said sensing lead to said conductive means in the same direction as that of the low resistance in said one directional resistance, wherein an indicator current will develop across said indicator terminals as a result of conductive contact between said conductive means and said first conductor and substantially no indicator current will be developed by contact with said conductive means and said second or third conductor or the ground to which such second and third conductors are connected.

58. The power circuit as defined in claim 57 further comprising another electrically conductive means in proximity to said relay, a fourth current blocking means connecting between said sensing lead and said other conductive means adapted to pass current to said indicator terminal from said other conductive means when conductively contacted by said first conductor.

59. The power circuit as defined in claim 49 wherein said second conductor is a grounded conductor, one said directional resistance means being connected to said first conductor and said other directional resistance means being connected to said second conductor, a common resistance connected between both of said directional resistance means.

60. The power circuit as defined in claim 52 in which the connection between said one directional resistance and said common resistance is further connected to the said one conductor from said source through another resistance for latching said interrupting means in the off-state.

61. The power circuit as defined in claim 60 further including a switching means, said other resistance being connected to said one conductor from the current source through said switching means for selectively disconnecting said other resistance.

62. The power system as defined in claim 54 further including a current responsive indicating device connected to said indicator terminals for indicating the presence of a fault condition.

63. The power circuit as defined in claim 49 wherein said circuit further includes two pairs of current blocking means, one pair of said blocking means passing one half cycle of said current from said alternating current source to said load, the other pair of said blocking means passing the other half cycle from said source to said load in a direction opposite to said one direction whereby substantially full wave current is delivered to said load from said source, said circuit further including a pair of unidirectionally triggered switching means connected to said source for supplying full wave actuating current to said relay, one of said unidirectionally triggered switching means passing one-half cycle from said source in one direction and the other of said unidirectionally triggered switching means passing the other half-cycle of current from the source in a direction opposite said one direction, at least one of said undirectionally triggered switching means passing its half-cycle of current from said source as actuating current to said relay, said power circuit including a pair of control means respectively connected to said unidirectionally triggered switching means and connected to said source to provide triggered current in each of said directions to respective said unidirectionally triggered switching means, said control means substantially reducing said trigger current to respective said unidirectionally triggered switching means and thus reducing the actuating current to said relay whenever a current flow opposite to said one direction is provided to said control means of either said unidirectionally triggered switching means by a connection that shunts one of said current blocking means to cause said relay to substantially interrupt the current supplied to said load, said resistance network initiating said control means to interrupt said substantial current to said load.

64. The power circuit as defined in claim 63 wherein said relay includes contacts to connect said source to said load, said other resistance connection to said one conductor being on the load side of said relay contacts which establish and interrupt current flow supplied through said one conductor to said load to maintain an interruption initiated by said resistance network until reset.

65. The power circuit as defined in claim 63 further comprising another relay, said indicator terminals being connected to said other relay which when energized by said small developed current activates said relay which causes interruption of current supplied by said source to said load.

66. The power system as defined in claim 49 wherein said circuit includes a pair of current blocking means, one of said blocking means passing one half cycle of said current from the alternating current source to the load, the other of said blocking means passing the other half cycle from the source to the load in a direction opposite to said one direction whereby substantially full wave current to said load, one of said from the source, said circuit further including a pair of unidirectionally triggered switching means connected to the source for supplying full wave current to said load, one of said unidirectionally triggered switching means passing the other half-cycle of current from the source in a direction opposite said one direction, said power circuit including a pair of control means respectively connected to said unidirectionally triggered switching means and connected to the source to provide trigger current in each of said directions to respective said unidirectionally triggered switching means, said control means substantially reducing said trigger current to respective said unidirectionally triggered switching means and thus reducing the current to said load whenever a current flow opposite to a said one direction is provided to said control means of either said unidirectionally triggered switching means by a connection that shunts one of said current blocking means to cause said unidirectionally triggered current switching means to substantially interrupt the current supplied to the load, said resistance network causing said control means to interrupt said substantial current to the load in response to a detected fault condition.

67. In a power system adapted to supply electrical current to a load, network means comprising at least four interconnected resistances and three current blocking means, including two of said resistances respectively connected to two of said current blocking means in parallel to form two directional resistances connected by one of the other two said resistances, the fourth resistance and the other of said current blocking means being connected between one conductor of a current source and another conductor of the current source, said network means having at least one pair of indicator terminals across which a current is developed to indicate faults of hazardous conductance and discontinuance of conductance in said system.

68. A power system as defined in claim 67 in which said current source is a source of alternating current.

69. A power system as defined in claim 67 in which a sensor lead to detect hazardous conductance and discontinuance is connected from one said indicator terminal to said other conductor through a fourth current blocking means.

70. A power system as defined in claim 69 in which said sensor lead is connected from the said one indicator terminal to a conductive means adjacent to said network means to detect hazardous conductance to said current source.

71. A power system as defined in claim 70 in which said sensor lead connection to said conductive means is made through a fifth current blocking means to detect hazardous conductance to said current source other than ground.

72. A power system as defined in claim 69 in which said sensor lead is connected from the said one indicator terminal to a conductive means adjacent to said load to detect hazardous conductance to said current source.

73. A power system as defined in claim 72 in which said sensor lead connection to said conductive means is made through a fifth unidirectional blocking mean to detect hazardous conductance to said current source other than ground.

74. A power system as defined in claim 67 wherein said system includes a load current relay adapted to be connected to the source for supplying current in both directions to the load, said system further including two pairs of current blocking means, one pair of said blocking means passing one half cycle of said current from the alternating current source to said load, the other pair of said blocking means passing the other half cycle from the source to said load whereby substantially full wave current is delivered to said load from the alternating current source, said system including a pair of unidirectionally triggered switching means connected to the alternating current source for supplying actuating current to said load current realy, one of said undirectionally triggered switching means passing one-half cycle from the alternating current source in one direction and the other of said undirectionally triggered switching means passing the other half-cycle of current from the alternating current source in a direction opposite said one direction, at least one of said unidirectionally triggered switching means supplying its said half-cycle of current from the alternating current source as current to acutate said load current relay, said supply circuit including a pair of control means respectively connected to said undirectionally triggered switching means and connected to the altenrating current source to provide trigger current in each of said directions to respective said unidirectionally triggered switching means, said control means substantially reducing said trigger current to respective said unidirectionally triggered swithcing means and thus reducing the current supplied to actuate said load current relay whenever a current flow opposite to a said one direction is provided to said control means of either said undirectionally triggered switching means by a connection that shunts one of said current blocking means to cause said load current relay to substantially interrupt the current supplied to said load, said indicator current developed in said network means is adapted to initiate a reverse current and fault reaction in said unidirectionally triggered switching means thereby interrupting the current supplied by said source to the load.

75. A network as defined in claim 73 in which said conductive means is also connected to said other conductor through a sixth current blocking means.

76. A network as defined in claim 74 in which said network means includes a second connection to said one terminal of the said current source through another resistance to provide a remotely resettable latching effect in fault initiated interruption of current to the load in said system.

77. The power circuit as defined in claim 76 wherein said load current relay having contacts to connect said supply to the load, said other resistance connection to said one conductor being on the load side of said relay contacts that establish and interrupt current flow supplied through said one conductor to the load to maintain an interruption until reset.

78. The power circuit as defined in claim 74 further comprising another relay, said indicator terminals being connected to said other relay which when energized by said small developed current actuates said interrupting means to interrupt current supplied from the source to the load.

79. The system as defined in claim 1 wherein said relay is connected to said load and connectable to a receptacle of a supply circuit for switching on and off the load current, said relay having first contact means closed when said relay is energized to complete the ground side of the energizing current path by contacting a grounded conductor from said supply circuit, said relay having a second contact means closed when said relay is not energized to deliver said load current and completes the ground side of said supply circuit path by contacting a grounding conductor wherein momentary initial energizing current for said relay is carried by said grounding conductor whereby load current is only supplied to said load when said receptacle is wired to permit functioning when connected to said supply circuit.

80. A power system comprising a pair of loads and a pair of current blocking means respectively being connected in series to said loads, one of said pair of blocking means passing substantial current in one direction through one said load and passing substantially no current in the opposite direction, the other of the said pair of blocking means passing substantial current in said opposite direction through the other said load and substantially no current in said one direction, said system further comprising a supply circuit connected to said pair of blocking means for connecting said loads to an alternating current source, said supply circuit including a load current relay for controllable supplying said substantial current from the alternating current source to said respective loads in each of said one and said opposite direction, said supply circuit including a zero sequence current transformer surrounding the current carrying conductors from the alternating current source to said supply circuit for producing a current in the coil of said transformer when an inequality in the amount of current carried by said conductors result from a ground fault, and means for amplifying said current produced in said transformer to initiate interruption of said substantial current from the alternating current source through said load current relay and thus to said load.

81. The system as defined in claim 1 further including means for supplying reverse current to said undirectionally triggered switching means, a current sensitive circuit opening means connecting in series with said undirectionally triggered switching means, said means for supplying reverse current attenuating the output current from said unidirectionally triggered switching means, said current sensitive circuit opening means being adjusted to carry said attenuated output current, said current supplied by said unidirectionally triggerred switching means being not attenuated whereby said actuating current is prevented from being supplied to said load current relay.

82. The system as defined in claim 81 wherein said means for supplying reverse current includes a resistance.

83. The system as defined in claim 82 wherein said means for supplying reverse current further includes a third unidirectional blocking means in series with said resistance.

84. The system as defined in claim 81 in which said circuit opening means includes a fuse.

85. The system as defined in claim 81 in which said means for supplying reverse current includes a relaxation oscillator.

86. The system as defined in claim 85 in which said relaxation oscillator includes a gas-filled tube and a capacitance connected in parallel therewith.

87. The system as defined in claim 1 further including means for supplying a limited pulsating reverse current to variably attenuate the output of current from said unidirectionally triggered switching means, said output of current being not attenuated below a level required to energize said load current relay a signalling device connected to receive current from said output current from said unidirectionally triggered switching means and to indicate a pulsating variation in attenuation of said output current as confirmation of reaction to said reverse current.

88. The system as defined in claim 1 further including means for supplying a limited fault current to said unidirectionally triggered switching means sufficient for the attenuation of actuating current from said unidirectionally triggered switching means and insufficient to cause interruption of the actuation of said load current relay, a circuit opening means sensitive to current overload connected to receive a current through said unidirectionally triggered switching means, said circuit opening means being adjusted to carry attenuated current while opening when said current is not attenuated whereby said actuating current is prevented from being supplied to said load current relay and substantially no current is supplied to said load.

89. The system as defined in claim 1 wherein said relay includes an actuating means connected to pass its energizing current through said load.

90. The system as defined in claim 89 wherein said energizing current for said relay actuating means is supplied directly by said unidirectionally triggered switching means to initially cause relay contact closure, and wherein a capacitance charged by current from said unidirectionally triggered switching means discharges to provide subsequent holding current for said relay actuating means.

91. The system as defined in claim 90 wherein said relay actuating means is connected to one side of the supply line from said supply circuit and is connected to the other side of said line by said capacitance.

92. The system as defined in claim 91 wherein said unidirectionally triggered switching means is connected to the juncture of said relay actuating means and said capacitance.

93. The system as defined in claim 92 further including a pair of undirectional blocking means connecting said capacitance to said other side of said supply line.

94. The system as defined in claim 93 wherein said pair of unidirectional blocking means is oriented to pass current in one direction from said load to said other side of said line and to pass current from said load to said capacitance in the same one direction as current is passed to said line from said capacitance and oriented to block current in a direction opposite to the said one direction from said capacitance to said load and from said line to said capacitance.

95. The electrical circuit as defined in claim 1 in which at least one of said first and second current blocking means passing substantial current in said one direction through said load and passing substantially less current in said opposite direction is defined by a synchronous switch opening and closing in accord with the reverse and forward cycles of said alternating current from said source.

96. The electrical circuit as defined in claim 95 in which both opening and closing of said synchronous switch is accomplished within the same half-cycle of said a.c. current during which the current flow is in said opposite direction and current flow in said opposite direction is blocked by the other of said first and second current blocking means.

97. The system as defined in claim 1 further including a synchronous switching means being connected in parallel with at least one of the said first and second current blocking means passing substantial current in said one direction through said load and passing substantially less current in said opposite direction and enhancing the conduction of current in said one direction.

98. The electrical circuit as defined in claim 97 in which both opening and closing of said synchronous switching means is accomplished within the same half-cycle of said a.c. current during which the current flow is in the said one direction to substantially eliminate any arcing of said switching means during opening and closing thereof.

99. The electrical circuit as defined in claim 19 in which at least one of said first and second and third current blocking means passing substantial current in said one direction through said load and passing substantially less current in said opposite direction is defined by a synchronous switch.

100. The electrical circuit as defined in claim 99 in which both opening and closing of said synchronous switch is accomplished within the same half-cycle of said a.c. current during which the current flow is in said opposite direction and current flow in said opposite direction is blocked by at least one of the other two of said first and second and third current blocking means.

101. The system as defined in claim 19 further including a synchronous switching means being connected in parallel with at least one of the said first and second and third current blocking means passing substantial current in said one direction through said load and passing substantially less current in said opposite direction and enhancing the conduction of current in said one direction.

102. The electrical circuit as defined in claim 101 in which both opening and closing of said synchronous switching means is accomplished within the same half-cycle of said a.c. current during which the current flow is in the said one direction to substantially eliminate any arcing of said switching means during opening and closing thereof.

* * * * *